(12) United States Patent
Vavassori et al.

(10) Patent No.: US 6,519,080 B2
(45) Date of Patent: Feb. 11, 2003

(54) OPTICAL AMPLIFIER AND OPTICAL TRANSMISSION SYSTEM

(75) Inventors: Paolo Vavassori, Bergamo (IT); Paolo Gurnari, Cesano Maderno (IT); Giovanni Sacchi, Milan (IT); Fabrizio Di Pasquale, Milan (IT)

(73) Assignee: Corning O.T.I. SpA, Milan (IT)

( * ) Notice: Subject to any disclaimer, the term of this patent is extended or adjusted under 35 U.S.C. 154(b) by 0 days.

(21) Appl. No.: 09/794,033

(22) Filed: Feb. 28, 2001

(65) Prior Publication Data

US 2001/0033412 A1 Oct. 25, 2001

Related U.S. Application Data

(63) Continuation of application No. PCT/IT00/00071, filed on Mar. 3, 2000.
(60) Provisional application No. 60/189,035, filed on Mar. 14, 2000.

(51) Int. Cl.[7] .............................. H01S 3/30; H01S 3/06
(52) U.S. Cl. .............................. 359/341.31; 359/337.3; 359/341.33; 359/341.5
(58) Field of Search ........................... 359/337.3, 337.4, 359/341.31–341.33, 341.5

(56) References Cited

U.S. PATENT DOCUMENTS

| 5,491,581 A | * | 2/1996 | Roba | 359/341 |
| 5,500,764 A | | 3/1996 | Armitage et al. | 359/341 |
| 5,808,787 A | | 9/1998 | Meli et al. | 359/341 |
| 5,936,763 A | | 8/1999 | Mitsuda et al. | 359/341 |
| 6,151,158 A | * | 11/2000 | Tobeda et al. | 359/341 |

FOREIGN PATENT DOCUMENTS

| EP | 0 735 704 | 10/1996 |
| EP | 0 897 205 | 2/1999 |
| EP | 0 964 275 | 12/1999 |

OTHER PUBLICATIONS

Yoshida et al, IEEE/Lasers and Electro–Optics Society, Aug. 1990, Tech. Digest, vol. 13, pp 282–285.*

Nakagawa et al, Journal of Lightwave Tech., vol. 9, #2, 2/91, pp 198–208.*

H. Ono, et al., "Gain–Flattened $Er^{3+}$ –Doped Fiber Amplifier for a WDM Signal in the 1.57–1.60–$\mu$m Wavelength Region", *IEEE Pho Tonics Technology Letters*, vol. 9, No. 5, pp. 596–598. (May 1997).

F.A. Flood, et al., "980–nm Pump–Band Wavelengths for Long–Wavelength–Band Eribium–Doped Fiber Amplifiers", *IEEE Pho Tonics Technology Letters*, vol. 11, No. 10, pp. 1232–1234, (Oct. 1999).

(List continued on next page.)

*Primary Examiner*—Nelson Moskowitz
(74) *Attorney, Agent, or Firm*—Svetlana Z. Short

(57) ABSTRACT

An optical transmission system includes an optical transmitting unit (10) to transmit optical signals in a transmission wavelength band above 1570 nm; an optical receiving unit to receive the optical signals; an optical fiber link optically coupling the transmitting unit to the receiving unit, at least an optical amplifying unit (100) coupled along the link and adapted to amplify the optical signals; the optical amplifying unit (100) having an amplification wavelength band including the transmission wavelength band and comprising: an input (101) for the input of the optical signals, an output (102) for the output of the optical signals, at least an erbium-doped active fiber (103a, 103b) for the amplification of the optical signals, having a first end optically coupled to the input (101) and a second end optically coupled to the output (102), a pump source (104, 106) for generating a pump radiation having a wavelength greater than 1400 nm and lower than 1470 nm, and an optical coupler (105, 107) optically coupling the pump source (104) to the active fiber (103a, 103b).

20 Claims, 18 Drawing Sheets

OTHER PUBLICATIONS

H. Masuda, et al., "Wideband,gain–flattened, erbium–doped fibre amplifiers with 3dB bandwidths of >50nm", *Electronics Letters*, vol. 33, No. 12, pp. 1070–1072, (Jun. 1997).

N.E. Jolley, et al., "Demonstration of low PMD and negligible m ultipath interference in an ultra flat broad band EDFA using a highly doped erbium fibre", *Official Amplifiers and Their Application*, pp. 124–127, (Jul. 1998).

* cited by examiner

OPTICAL AMPLIFIER AND OPTICAL TRANSMISSION SYSTEM

This application is a continuation of International Application No. PCT/IT00/00071, filed Mar. 3, 2000, and claims the benefit of U.S. Provisional Application No. 60/189,035, filed Mar. 14, 2000, the content of both of which is incorporated herein by reference.

It is an object of the present invention to provide an optical amplifying unit to be used for optical telecommunications. The invention also relates to an optical transmission system, more particularly a wavelength division multiplexing (WDM) optical transmission system, which uses the above-mentioned optical amplifying unit. The optical amplifying unit of the invention is also adapted to be used in analog applications, for example for CATV systems.

In WDM optical transmission systems, transmission signals including several optical channels are sent over a same line (that includes at least an optical amplifier) by means of wavelength division multiplexing. The transmitted channels may be either digital or analog and are distinguishable because each of them is associated with a specific wavelength.

Present-day long-distance high-capacity optical transmission systems use optical fiber amplifiers that, differently from previously used electronic regenerators, do not need OE/EO conversion. An optical fiber amplifier includes an optical fiber of preset length, having the core doped with one or more rare earths so as to amplify optical signals by stimulated emission when excited by pump radiation.

Optical fibers doped with erbium (Er) have been developed for use as both optical amplifiers and lasers. These devices are of considerable importance since their operating wavelength coincides with the third window for optical fiber communications, around 1550 nm.

Patent application EP 964275 in the name of the Applicant proposes a thirty-two channels WDM optical transmission system that uses erbium-doped fiber amplifiers (EDFAs) in the wavelength bands 1529–1535 nm and 1541–1561 nm.

Patent application EP 897205 A2 in the name of Fujitsu Limited describes a device comprising an erbium-doped fiber optical amplifier, and first and second optical filters operatively connected to the optical amplifier to suppress the wavelength dependence of gain in the gain bands 1.52–1.54 $\mu$m and 1.54–1.58 $\mu$m, the optical amplifier being pumped in a 0.98 $\mu$m band or in a 1.48 $\mu$m band.

Several methods have been proposed to improve the system performances in terms of amplification bandwidth in order to increase the number of channels to be transmitted. One way to increase channel numbers is to narrow the channel spacing. However, narrowing channels spacing worsens nonlinear effects such as cross-phase modulation or four wave mixing, and makes accurate wavelength control of the optical transmitters necessary. Applicant has observed that a channel spacing lower than 50 GHz is difficult to achieve in practice do to the above reasons.

Another way to increase the channel number is to widen the usable wavelength bandwidth in the low loss region of the fiber. One key technology is optical amplification in the wavelength region over the conventional 1550 nm transmission band. In particular, the high wavelength band around 1590 nm, and precisely between 1565 nm and 1620 nm, is a very promising band for long-distance optical transmissions, in that a very high number of channels can be allocated in that band. If the optical amplifier for the 1565–1620 nm band must deal with a high number of channels, the spectral gain characteristics of such amplifier are fundamental to optimize the system's performances and costs. The use of the 1590 nm transmission wavelength region of erbium-doped fiber amplifiers in parallel to the 1530 and 1550 wavelength regions, is attractive and has been recently considered. As an additional advantage, by employing the 1590 nm wavelength region it is possible to use dispersion-shifted fiber (DSF) for WDM transmissions without any degradation caused by four-wave mixing.

Several articles in the patent and non-patent literature address amplification by erbium-doped fiber amplifiers in the high wavelength transmission band (from 1565 nm up to 1620 nm).

U.S. Pat. No. 5,500,764 relates to a $SiO_2$—$Al_2O_3$—$GeO_2$ single-mode optical fiber (having a length between 150 m and 200 m) doped with erbium, pumped by 1.55 $\mu$m and 1.47 $\mu$m optical sources and adapted to amplify optical signals between 1.57 $\mu$m and 1.61 $\mu$m.

Ono et al., "Gain-Flattened $Er^{3+}$-Doped Fiber Amplifier for a WDM Signal in the 1.57–1.60 $\mu$m Wavelength Region", IEEE PHOTONICS TECHNOLOGY LETTERS, Vol. 9, No. 5, May 1997, pp. 596–599, disclose a gain-flattened $Er^{3+}$-doped silica-based fiber amplifier for the 1.58 $\mu$m band WDM signal; different fiber lengths were tested and the authors found that 200 m was the optimum length of EDF (Erbium-Doped Fiber) for constructing an EDFA with high gain and low noise.

Masuda et al., "Wideband, gain-flattened, erbium-doped fibre amplifiers with 3 dB bandwidths of >50 nm", ELECTRONICS LETTERS, Jun. 5, 1997, Vol. 33, No. 12, pp. 1070–1072, propose a scheme with two-stage erbium-doped fibres and an intermediate equalizer, obtaining a 52 nm band (1556–1608 nm) for a silicate erbium-doped fiber amplifier and a 50 nm band (1554–1604 nm) for a fluoride erbium-doped fiber amplifier; in the case of a silicate erbium-doped fiber amplifier, the two stages include a 50 m EDF and a 26 m EDF, respectively. In the proposed experiment, the two EDFs are pumped by 1480 nm laser diode sources via dichroic mirror-type wavelength-selective couplers.

Jolley et al., "Demonstration of low PMD and negligible multipath interference in an ultra flat broad band EDFA using a highly doped erbium fiber", "Optical Amplifiers and their Applications" Conference, Vail, Colo., Jul. 27–29 1998, TuD2-1/124–127 proposes a broad band EDFA which amplifies signals in the 1585 nm band using 45 m of erbium fiber and reaching a maximum external power of more than +18.3 dBm at 1570. The active fiber is bidirectionally pumped by a 980 nm laser diode and a 1480 nm laser diode.

The Applicant has observed that the pump wavelength is an important parameter for the design of optical amplifiers in the considered band, since it influences the amplifier's performances in terms of gain efficiency and noise figure. This influence is not observable in conventional amplifiers in the 1550 nm band, in which the effects of the pump wavelength choice are prevalently on the spectral shape of the gain curve.

F. A. Flood and C. C. Wang, "980-nm Pump-Band Wavelengths for Long-Wavelength-Band Erbium-Doped Fiber Amplifiers", IEEE Photonics Technology Letters, Vol. 11, No. 10, Oct, 1999, attests the importance of a careful choice of pump wavelengths to ensure optimum amplifier performance in the long-wavelength band (L-band) and shows the dependency of output signal power and backward amplified spontaneous emission (ASE) power on 980-nm band pump wavelength and input signal power for a L-band EDFA. In particular, this article demonstrates that tuning pump wavelength ±30-nm away from the 980-nm absorption peak provides 3–5 dB improvement in pump-to-signal conversion.

The Applicant has tackled the problem of providing an optical amplifier for the L-band with improved performances with respect to the known amplifiers above described.

The Applicant has first observed that 1480-nm pumping determines best performances with respect to 980-nm pumping in the considered amplifiers in terms of power conversion efficiency and quantum conversion efficiency. For power EDFA's, the power conversion efficiency (PCE) can be defined as the ratio:

$$PCE = \frac{P_s^{out} - P_s^{in}}{P_p^{in}}$$

where $P_s^{in}$, $P_s^{out}$ and $P_p^{in}$ are the signal power at the input and at the output of the amplifier and the pump power at the input of the amplifier, respectively, while the quantum conversion efficiency (QCE) can be defined by:

$$QCE = \frac{\phi_s^{out} - \phi_s^{in}}{\phi_p^{in}} = \frac{\lambda_s}{\lambda_p} PCE,$$

where $\phi_p^{in}$, $\phi_s^{in}$ and $\phi_s^{out}$ are the input or output pump and signal photon fluxes ($\phi_{p,s}^x = P_{p,s}^x / h\nu_{p,s}$). The maximum possible value for the QCE is unity, which corresponds to the case where all pump photons are effectively converted into signal photons.

The Applicant has then found that, in the L-band of erbium-doped fiber amplifiers, for pump wavelengths below 1480 nm both the amplifier output power (and, then, the gain efficiency) and the noise figure are related to the pump wavelength used to provoke the population inversion of the active material. The Applicant has found that the phenomena here involved are different from those that operate in the case of pump wavelength lower than 980 nm.

The Applicant has in particular found that a very efficient and relatively low-noise optical amplifier adapted to operate in the L-band can be obtained by pumping an erbium-doped active fiber by means of one or more detuned 1480-nm pumps. The Applicant has further found that the performances of an optical amplifier adapted to operate in the L-band and pumped at 1480 nm or below 1480 nm can be improved by using active fibers having a numerical aperture and an aluminum concentration opportunely chosen within predetermined ranges.

Accordingly, the present invention relates, in a first aspect, to an optical transmission system including:
  an optical transmitting unit to transmit optical signals in a transmission wavelength band above 1570 nm,
  an optical receiving unit to receive said optical signals,
  an optical fiber link optically coupling said transmitting unit to said receiving unit and adapted to convey said optical signals, and
  at least an optical amplifying unit coupled along said link and adapted to amplify said optical signals; said optical amplifying unit having an amplification wavelength band including said transmission wavelength band and comprising:
    an input for the input of said optical signals,
    an output for the output of said optical signals,
    at least an erbium-doped active fiber, having a first end optically coupled to said input and a second end optically coupled to said output, for the amplification of said optical signals,
    a pump source for generating a pump radiation adapted to excite erbium, and
    an optical coupler optically coupling said pump source to said at least an active fibre,
  wherein said pump source has an emission wavelength greater than 1400 nm and lower than 1470 nm, preferably comprised between 1430 nm and 1460 nm.

Advantageously, said optical coupler mat be positioned between said input and the first end of said at least an active fiber to provide said pump radiation to said at least an active fiber in a co-propagating direction.

The amplifying unit may include a further pump source for generating a further pump radiation adapted to excite erbium, and a further optical coupler positioned between the second end of said at least an active fiber and said output to provide said further pump radiation to said at least an active fiber in a counter-propagating direction.

Preferably, said at least an active fiber includes a first and a second active fiber arranged in series.

Preferably, the optical transmission system is a WDM system.

Preferably, the width of said amplification wavelength band is at least 15 nm, more preferably at least 25 nm.

Preferably, said at least an active fiber has a core having a concentration of erbium between approximately $0.8 \cdot 10^{25}$ ions/m³ ppm and $1.6 \cdot 10^{25}$ ions/m³ ppm.

Preferably, said at least an active fiber has a total length lower than 70 m.

Preferably, said optical fiber link includes a plurality of optical fiber spans each having a length of at least 100 km.

Preferably, said pump source is a semiconductor laser diode.

Said amplification wavelength band may allocate at least 32 channels, more preferably at least 64 channels.

According to a second aspect, the present invention relates to a method for transmitting optical signals, comprising generating at optical signal having a wavelength greater than 1570 nm, transmitting said optical signal in a long-distance optical fiber link and receiving said optical signal, said step of transmitting including feeding said optical signal to at least an erbium-doped active fiber for amplification, wherein it includes providing to said at least an erbium-doped active fiber a pump radiation having a wavelength greater than 1400 nm and lower than 1470 nm.

Said pump radiation has a wavelength preferably greater than 1430 nm and lower than 1460 nm.

Said step of generating at optical signal may include generating a plurality of optical signals at respective wavelengths greater than 1570 nm, and said step of transmitting may include wavelength multiplexing said plurality of optical signals.

Said at least an erbium-doped active fiber may include a first and a second erbium-doped active fiber, and in said step of providing to said at least an erbium-doped active fiber a pump radiation may include providing to each of said first and second active fiber respective pump radiations in a co-propagating direction and/or in a counter-propagating direction.

According to a further aspect, the present invention relates to an optical amplifying unit having an amplification wavelength band above 1570 nm, comprising:
  an input for the input of optical signals,
  an output for the output of said optical signals,
  at least an erbium-doped active fiber having a first end optically coupled to said input and a second end optically coupled to said output, for the amplification of said optical signals,
  a pump source for generating a pump radiation adapted to excite erbium, and an optical coupler optically coupling said pump source to said at least an active fibre, wherein said pump source has an emission wavelength greater than 1400 nm and lower than 1470 nm.

Said at least an erbium-doped active fiber may include a first active fiber and a second active fiber arranged in series, said optical coupler feeding said pump radiation to said first active fiber, said optical amplifying unit including a further pump source for generating a further pump radiation adapted to excite erbium and a further optical coupler for feeding said further pump radiation to said second active fiber.

Said optical coupler may be positioned between said input and said first active fiber for feeding said pump radiation to said first active fiber in a co-propagating direction, and said further optical coupler may be positioned between said second active fiber and said output for feeding said further pump radiation to said second active fiber in a counter-propagating direction.

The active fiber has a core including a concentration of Al preferably comprised between 1% and 6% weight molar concentration, more preferably comprised between 2% and 3% weight molar concentration.

Said active fiber has a numeric aperture NA preferably comprised between 0.25 and 0.32, more preferably comprised between 0.27 and 0.3.

According to a further aspect, the present invention relates to an optical amplifying unit having an amplification wavelength band above 1570 nm, comprising:

an input for the input of optical signals, an output for the output of said optical signals, at least an active fiber having a core doped with erbium and aluminum and having a first end optically coupled to said input and a second end optically coupled to said output, for the amplification of said optical signals, a pump source for generating a pump radiation at a wavelength between 1400 nm and 1480 nm for exciting erbium, and an optical coupler optically coupling said pump source to said at least an active fibre, wherein the Al concentration in the core of said active fiber is comprised between 1% and 6% weight molar concentration, preferably between 2% and 3% weight molar concentration.

Preferably, said active fiber has a numeric aperture NA comprised between 0.25 and 0.32, more preferably comprised between 0.27 and 0.3.

According to a further aspect, the present invention relates to an optical amplifying unit having an amplification wavelength band above 1570 nm, comprising:

an input for the input of optical signals, an output for the output of said optical signals, at least an active fiber having a core doped with erbium and aluminum and having a first end optically coupled to said input and a second end optically coupled to said output, for the amplification of said optical signals a pump source for generating a pump radiation at a wavelength between 1400 nm and 1480 nm for exciting erbium, and an optical coupler optically coupling said pump source to said at least an active fibre, wherein the Al concentration in the core of said active fiber has a numeric aperture NA comprised between 0.25 and 0.32, preferably comprised between 0.27 and 0.3.

The foregoing general description and the following detailed description are exemplary and explanatory only and are not restrictive of the invention as claimed. The following description, as well as the practice of the invention, set forth and suggest additional advantages and purposes of this invention.

The accompanying drawings, which are incorporated in and constitute a part of this specification, illustrate embodiments of the invention, and together with the description, explain the advantages and principles of the invention.

Figure 14:
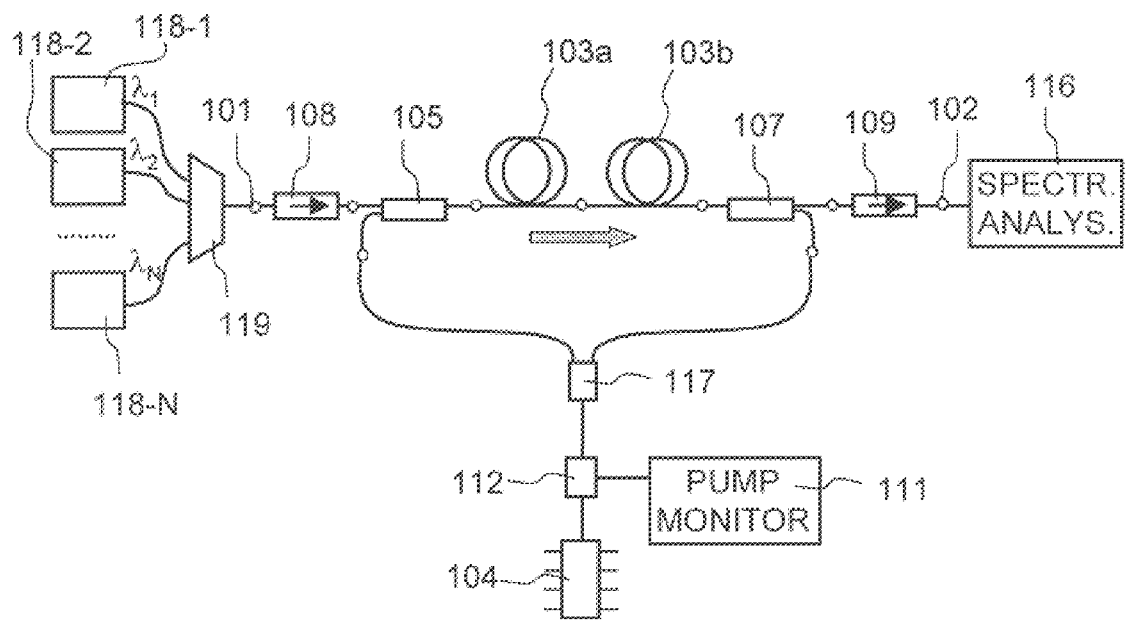
Figure 28:
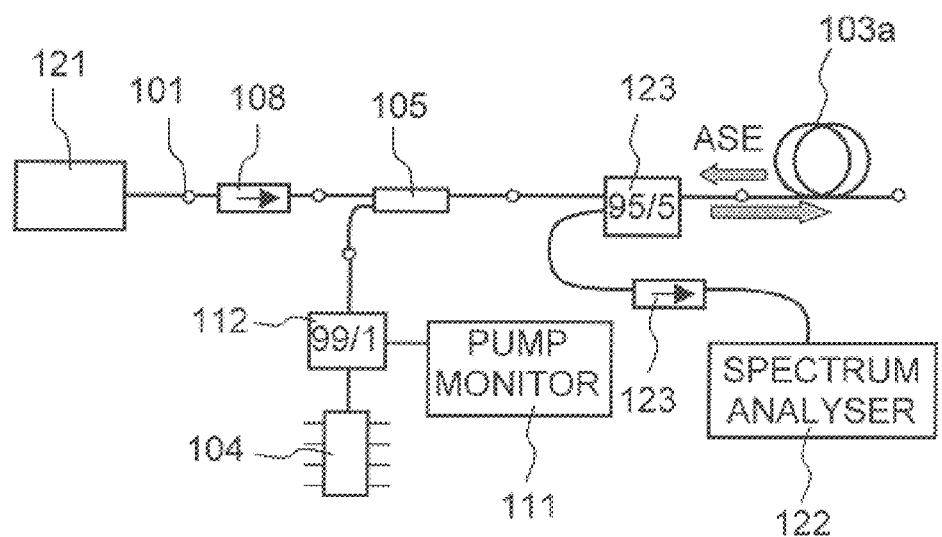
Figure 29:
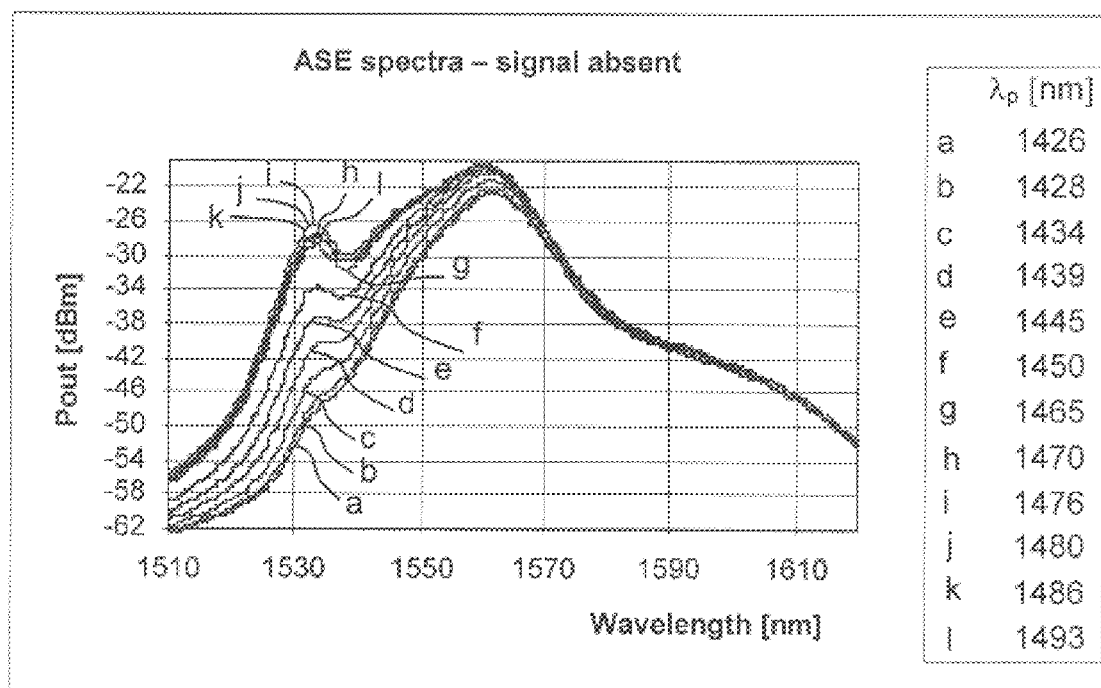
Figure 30:
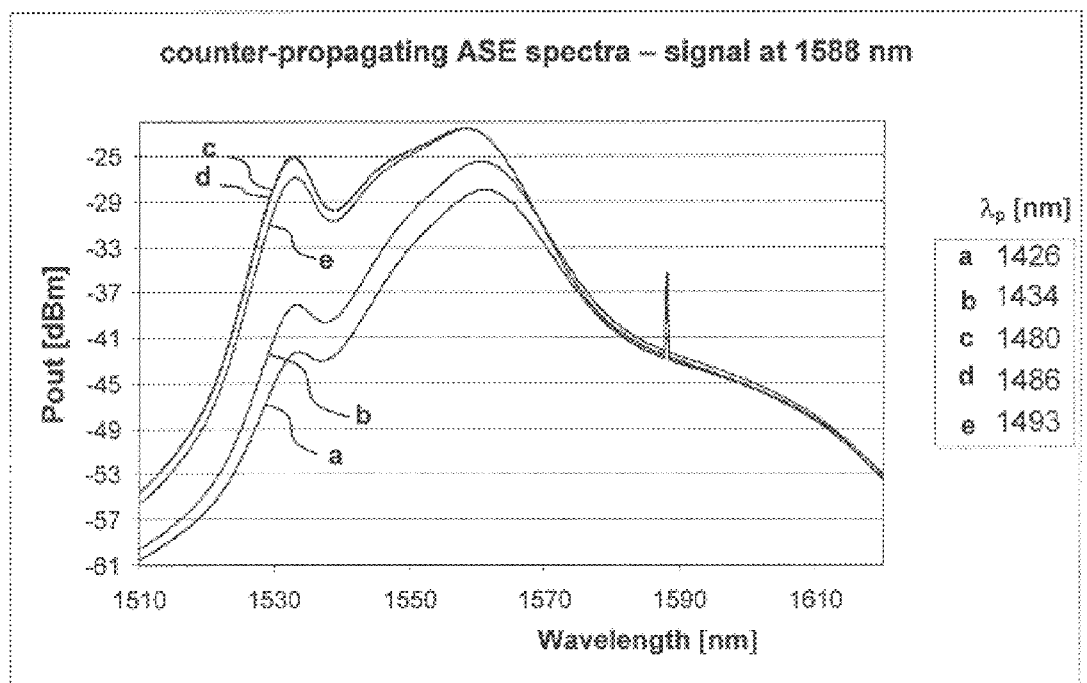
Figure 31:
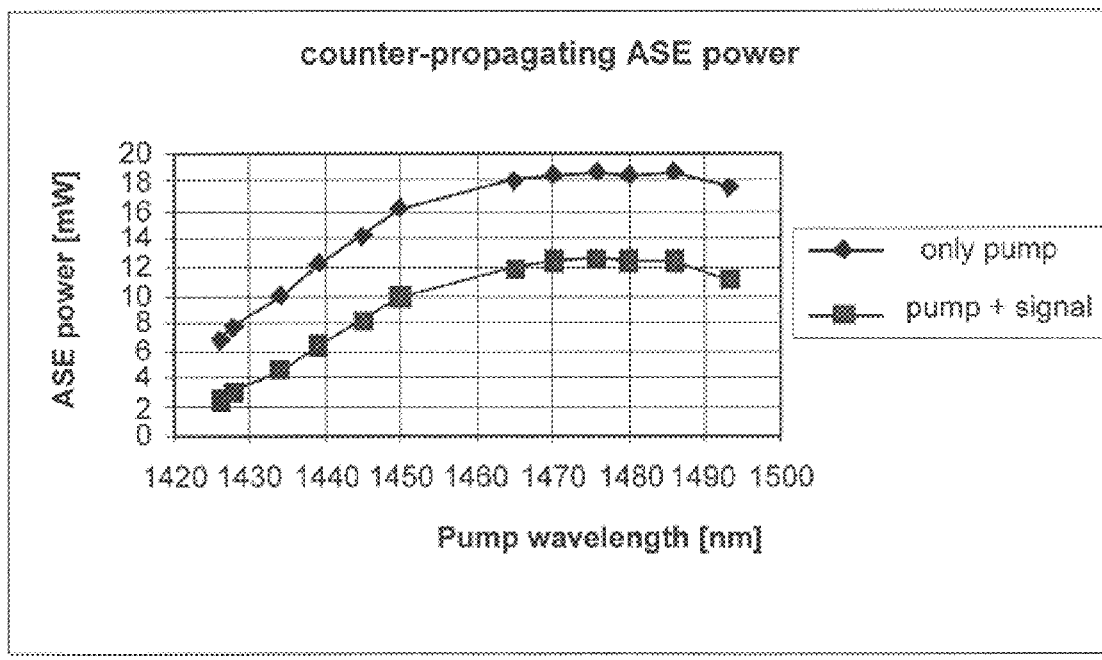

FIG. 14 relates to a second experimental setup to test a double-stage amplifier according to the present invention;

FIGS. 15–27 show the results of the experimental measures performed by means of the setup of FIG. 14;

FIG. 28 shows a third experimental setup to measure the counter-propagating ASE in an active fiber pumped by means of a detuned 1480 pump source;

FIGS. 29–31 illustrate the results of the experimental measures performed by means of the setup of FIG. 28.

Figure 1:
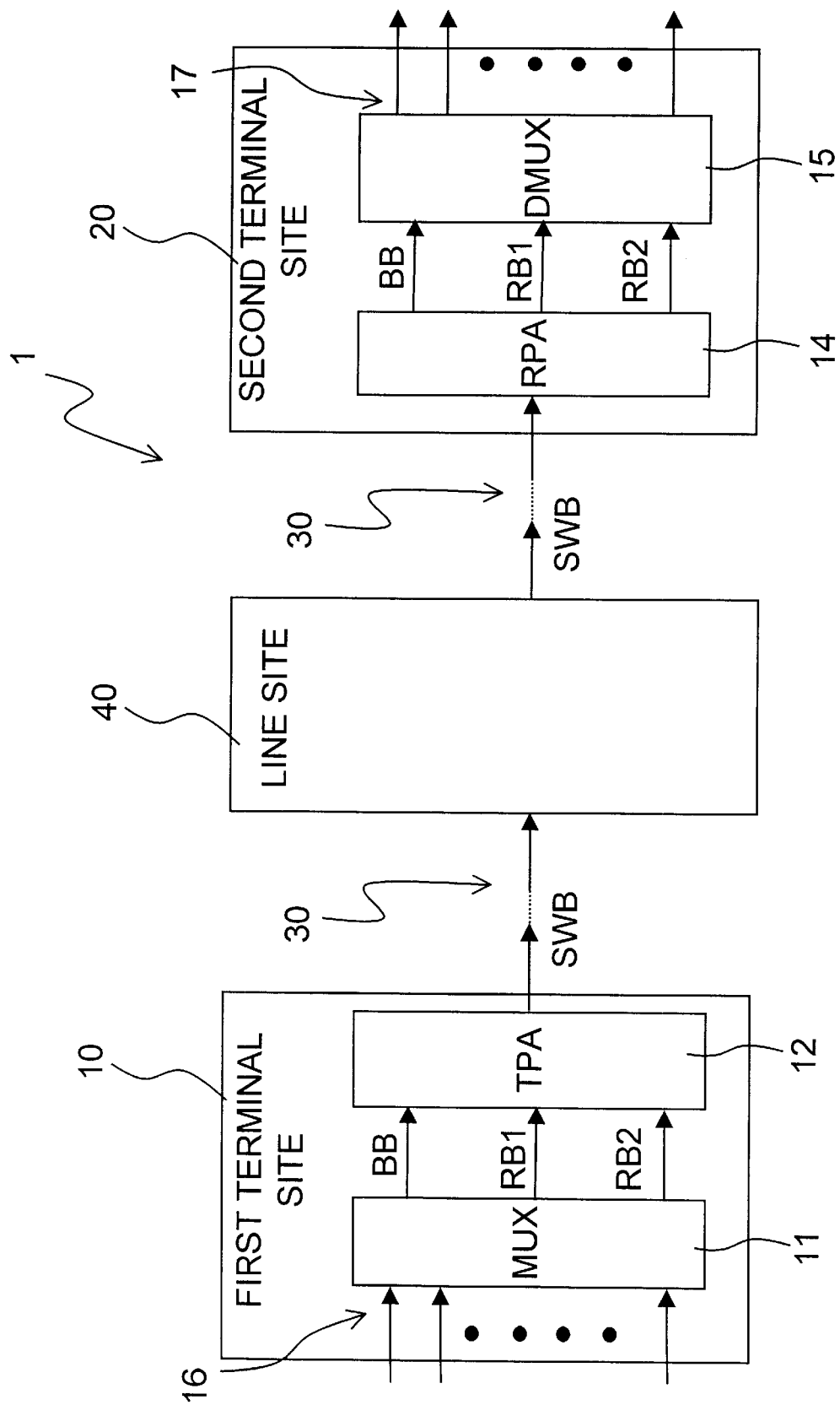
FIG. 1 is a block diagram of an optical transmission system consistent with the present invention.

Referring to FIG. 1, an optical transmission system 1 includes a first terminal site 10, a second terminal site 20, an optical fiber line 30 connecting the two terminal sites 10, 20, and at least one line site 40 interposed between the terminal sites 10 and 20 along the optical fiber line 30. For example, optical transmission system 1 is a long-distance (of the order of transoceanic distances, i.e. several hundred kilometers) submarine system connecting remote sites 10 and 20.

For simplicity, the optical transmission system 1 hereinafter described is unidirectional, that is signals travel from a terminal site to the other (in the present case from the first terminal site to the second terminal site), but any consideration that follow is to be considered valid also for bi-directional systems, in which signals travel in both directions. Further, although the optical transmission system 1 is adapted to transmit up to one-hundred-twenty-eight (128) channels, from the hereinafter description it will be obvious that the number of channels is not a limiting feature for the scope and the spirit of the invention, and less or more than one-hundred-twenty-eight (128) channels can be used depending on the needs and requirements of the particular optical transmission system.

The first terminal site 10 preferably includes a multiplexing section (MUX) 11 adapted to receive a plurality of input channels 16, and a transmitter power amplifier section (TPA) 12. The second terminal site 20 preferably includes a receiver pre-amplifier (RPA) section 14 and a demultiplexing section (DMUX) 15 adapted to output a plurality of output channels 17.

Multiplexing section 11, hereinafter described with reference to FIG. 3, multiplexes or groups input channels 16 preferably into three sub-bands, referred to as blue-band BB, first red-band RB1 and second red-band RB2, although multiplexing section 11 could alternatively group input channels 16 into a number of sub-bands greater or less than three.

The three sub-bands BB, RB1 and RB2 are then received, as separate sub-bands or as a combined wide-band, in succession by TPA section 12, at least one line site 40 and second terminal site 20. Sections of optical fiber line 30 adjoin the at least one line site 40 with TPA section 12, RPA section 14, and possibly with others line sites 40 (not shown). TPA section 12, that will be later described with reference to FIG. 4, receives the separate sub-bands BB, RB1 and RB2 from multiplexing section 11, amplifies and optimizes them, and then combines them into a single wide-band SWB for transmission on a first section of optical fiber line 30. Line site 40, that will be later described with reference to FIG. 6, receives the single wide-band SWB, re-divides the single wide-band SWB into the three sub-bands BB, RB1 and RB2, eventually adds and drops signals in each sub-band BB, RB1 and RB2, amplifies and optimizes the three sub-bands BB, RB1 and RB2 and then recombines them into the single wide-band SWB. For the adding and dropping operations, line site 40 may be provided with Optical Add/Drop Multiplexers (OADM) of a known type or, for example, of the type described in the patent application EP964275 in the name of the Applicant.

A second section of optical fiber line 30 couples the output of the line site 40 to either another line site 40 (not shown) or to RPA section 14 of second terminal site 20. RPA section 14, that will be later described with reference to FIG. 7, also amplifies and optimizes the single wide-band SWB and may split the single wide-band SWB into the three sub-bands BB, RB1 and RB2 before outputting them.

Demultiplexing section 15, that will be later described with reference to FIG. 8, receives the three sub-bands BB, RB1 and RB2 from RPA section 14 and splits the three sub-bands BB, RB1 and RB2 into the individual wavelengths of output channels 17. The number of input channels 16 and output channels 17 may be unequal, owing to the fact that some channels can be dropped and/or added in line site (or line sites) 40.

According to the above, for each sub-band BB, RB1 and RB2 an optical link is defined between the corresponding input of TPA section 12 and the corresponding output of RPA section 14.

The first sub-band BB preferably covers the range between 1529 nm and 1535 nm and allocates up to sixteen (16) channels, the second sub-band RB1 falls between 1541 nm and 1561 nm and allocates up to forty-eight (48) channels, and the third sub-band RB2 covers the range between 1575 nm and 1602 nm and allocates up to sixty-four (64) channels.

Adjacent channels, in the proposed one-hundred-twenty-eight (128) channel system, have preferably a 50 GHz constant spacing. Alternatively, a different constant spacing may be used, or the frequency spacing may be unequal to alleviate the known four-wave-mixing phenomenon.

In the erbium amplification band, the RB1 and RB2 bands have a fairly flat gain characteristic, while the BB band includes a substantial hump in the gain response. As explained below, to make use of the erbium-doped fiber spectral emission range in the BB band, optical transmission system 1 uses equalizing means to flatten the gain characteristic in that range. As a result, by dividing the erbium-doped fiber spectral emission range of 1529–1602 nm into three sub-ranges that respectively include the BB band, RB1 band and RB2 band, optical transmission system 1 can effectively use most of the erbium-doped fiber spectral emission range and provide for dense WDM.

The following provides a more detailed description of the various modules of the present invention depicted in FIG. 1.

Figure 2:
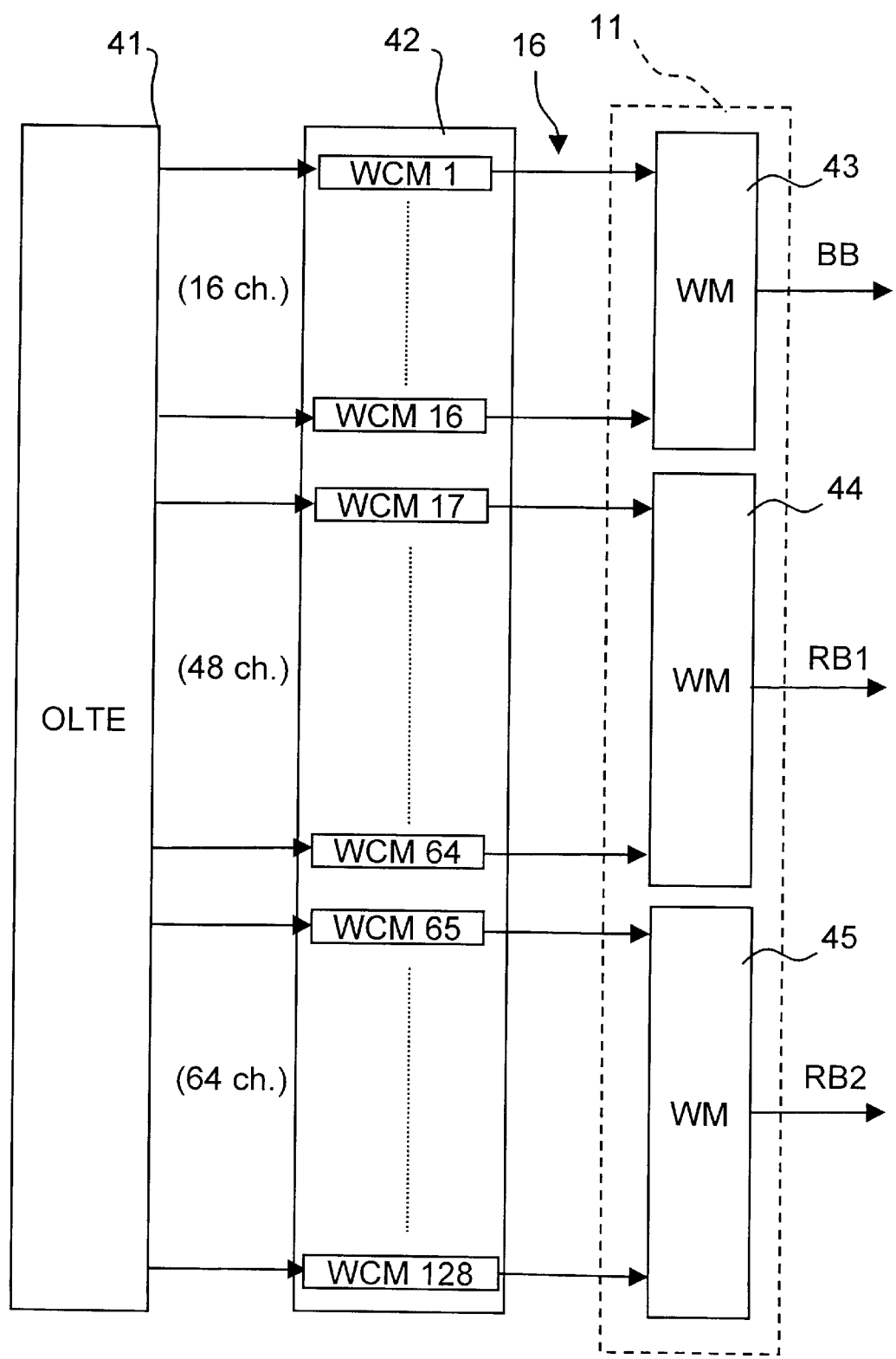
FIG. 2 is a more detailed diagram of the multiplexing section of the optical transmission system in FIG. 1.

FIG. 2 shows a more detailed diagram of the first terminal site 10. The first terminal site 10 includes, in addition to the multiplexing section 11 and the TPA section 12 (not shown in FIG. 2), an optical line terminal section (OLTE) 41 and a wavelength converter section (WCS) 42.

OLTE 41, which may correspond to standard line terminating equipment for use in a standard system, e.g. a SONET, ATM, IP or SDH system, includes transmit/receive (TX/RX) units (not shown) in a quantity that equals the number of channels in WDM systems 10. In a preferred embodiment, OLTE 41 has one-hundred-twenty-eight (128) TX/RX units. In multiplexing section 11, OLTE 41 transmits a plurality of signals at a generic wavelength. As shown in FIG. 2, in a preferred embodiment OLTE 41 outputs a first group of sixteen (16) channels, a second group of forty-eight (48) channels and a third group of sixty-four (64) channels. However, as indicated above, the number of channels may vary depending on the needs and requirements of the particular optical transmission system.

As readily understood to one of ordinary skill in the art, OLTE 41 may comprise a collection of smaller separate OLTEs, such as three, that feed information frequencies to WCS 42. Accordingly, WCS 42 includes one-hundred-twenty-eight (128) wavelength converter modules WCM1–WCM128.

Units WCM1–WCM16 each receive a respective one of the first group of signals emitted from OLTE 41, units WCM17–WCM64 each receive one of the second group of signals emitted from OLTE 41 and units WCM65–WCM128 each receive one of the third group of signals emitted from OLTE 41. Each unit is able to convert a signal from a generic wavelength to a selected wavelength and re-transmit the signal, The units may receive and re-transmit a signal in a standard format, such as OC-48 or STM-16, but the preferred operation of WCM1–128 is transparent to the particular data format employed.

Each WCM1–128 preferably comprises a module having a photodiode (not shown) for receiving an optical signal from OLTE 41 and converting it to an electrical signal, a laser or optical source (not shown) for generating a fixed carrier wavelength, and an electro-optic modulator such as a Mach-Zehnder modulator (not shown) for externally modulating the fixed carrier wavelength with the electrical signal. Alternatively, each WCM1–128 may comprise a photodiode (not shown) together with a laser diode (not shown) that is directly modulated with the electrical signal to convert the received wavelength to the carrier wavelength of the laser diode. As a further alternative, each WCM1–128 comprises a module having a high sensitivity receiver (e.g., according to SDH or SONET standards) for receiving an optical signal, e.g., via a wavelength demultiplexer, from a trunk fiber line end and converting it to an electrical signal, and a direct modulation or external modulation laser source. By the latter alternative, regeneration of signals from the output of a trunk fiber line and transmission in the inventive optical communication system is made possible, which allows extending the total link length.

Although FIG. 2 shows that the signals are provided and generated by the combination of OLTE 41 and WCM1–WCM128, the signals can also be directly provided and generated by a source without limitation to their origin.

The multiplexing section 11 includes three wavelength multiplexers (WM) 43, 44 and 45. For the preferred one-hundred-twenty-eight (128) channels system, each selected wavelength signal output from units WCMI–WCM16 is received by WM 43, each selected wavelength signal output from WCM17–WCM64 is received by WM 44 and each selected wavelength signal output from WCM65–WCM128 is received by WM 45. WM 43, WM 44 and WM 45 combine the received signals of the three bands BB, RB1 and RB2 into three respective wavelength division multiplexed signals. As shown in FIG. 2, WM 43 is a sixteen (16) channels wavelength multiplexer, such as a conventional 1×16 planar optical splitter, WM 44 is a forty-eight (48) channels wavelength multiplexer, such as a conventional 1×64 planar optical splitter with sixteen (16) unused ports and WM 45 is a sixty-four (64) channels wavelength multiplexer, such as a conventional 1×64 planar optical splitter. Each wavelength multiplexer may include a second port (e.g. 2×16 and 2×64 splitters) for providing optical transmission system 1 with an optical monitoring channel (not shown). As well, WM 43, 44 and 45 may have more inputs than is used by the system to provide space for system growth. A wavelength multiplexer using passive silica-on-silicon ($SiO_2$—Si) or silica-on-silica ($SiO_2$—$SiO_2$) technology, for instance, can be made by one of ordinary skill in the art. Other technologies can also be used for WMs, e.g., for reducing insertion losses. Examples are AWG (Arrayed Waveguide Gratings), cascaded Mach-Zehnder, fiber gratings, and interferential filters.

Figure 3:
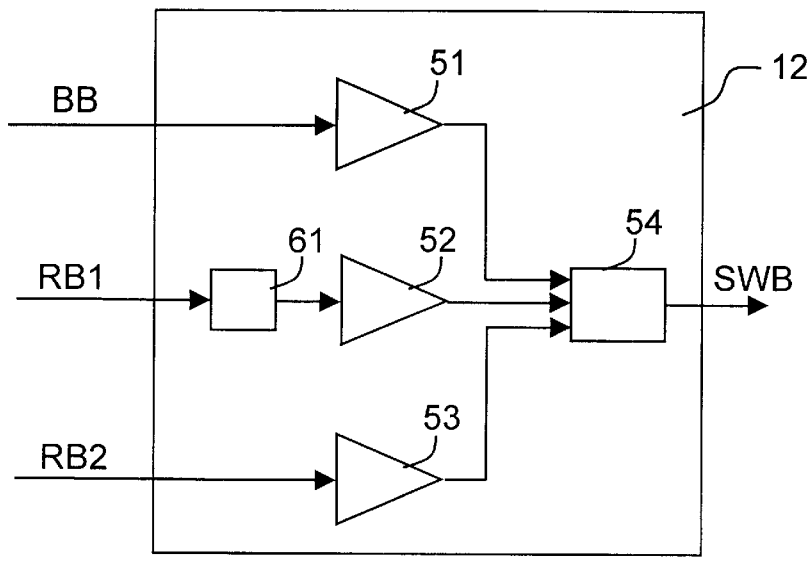
FIG. 3 is a more detailed diagram of the transmitter power amplifier section of the optical transmission system in FIG. 1.

With reference to FIG. 3, the BB, RB1 and RB2 band output from multiplexing section 11 are received by TPA section 12. The BB, RB1 and RB2 band signals may be provided to TPA section 12 from a source other than the OLTE 41, WCS 42, and WM 43, 44 and 45 configuration depicted in FIG. 2. For example, the BB, RB1 and RB2 band signals may be generated and directly supplied to TPA section 12 by a customer without departing from the intent of the present invention described in more detail below.

TPA section 12 includes three amplifier sections 51, 52, 53, each for a respective band BB, RB1 and RB2, a coupling filter 54 and an equalizing filter 61. Amplifier sections 51, 52 are preferably erbium-doped two-stages fiber amplifiers (although other rare-earth-doped fiber amplifiers may be used), while amplifier section 53 is an erbium amplifier of the type hereinbelow described with reference to FIG. 8.

The outputs of amplifiers 51, 52 and 53 are received by filter 54, which combines the BB, RB1 and RB2 bands into a single wide-band (SWB).

Each of the amplifiers 51 and 52 is pumped by one or two laser diodes to provide optical gain to the signals it amplifies. The characteristics of each amplifier, including its length and pump wavelength, are selected to optimize the performance of that amplifier for the particular sub-band that it amplifies. For example, the first stage (pre-amplifier) of amplifier sections 51 and 52 may be pumped with a laser diode (not shown) operating at 980 nm to amplify the BB band and the RB1 band, respectively, in a linear or in a saturated regime. Appropriate laser diodes are available from the Applicant. The laser diodes may be coupled to the optical path of the pre-amplifiers using 980/1550 WDM couplers (not shown) commonly available on the market, for example model SWDM0915SPR from E-TEK DYNAMICS, INC., 1885 Lundy Ave., San Jose, Calif. (USA). The 980 nm laser diode provides a low noise figure for the amplifiers compared with other possible pump wavelengths.

The second stage of each amplifier sections 51, 52 preferably operates in a saturated condition. The second stage of amplifier section 51 is preferably erbium-doped and amplifies the BB band with another 980 nm pump (not shown) coupled to the optical path of the BB band using a WDM coupler (not shown) described above. The 980 nm pump provides better gain behavior and noise figure for signals in the low band region that covers 1529–35 nm. The second stage of amplifier section 52 is preferably erbium-doped and amplifies the RB1 band with a laser diode pump source operating at 1480 nm. Such a laser diode is available on the market, such as model FOL1402PAX-1 supplied by JDS FITEL, INC., 570 Heston Drive, Nepean, Ontario (CA). The 1480 nm pump provides better saturated conversion efficiency behavior, which is exploited in the RB1 band for the greater number of channels in the region that covers 1542–61 nm. Alternatively, a higher power 980 nm pump laser or multiplexed pump sources in the 980 nm wavelength region may be used. Section 53 will be hereunder described in details with reference to FIG. 8.

Figure 4:
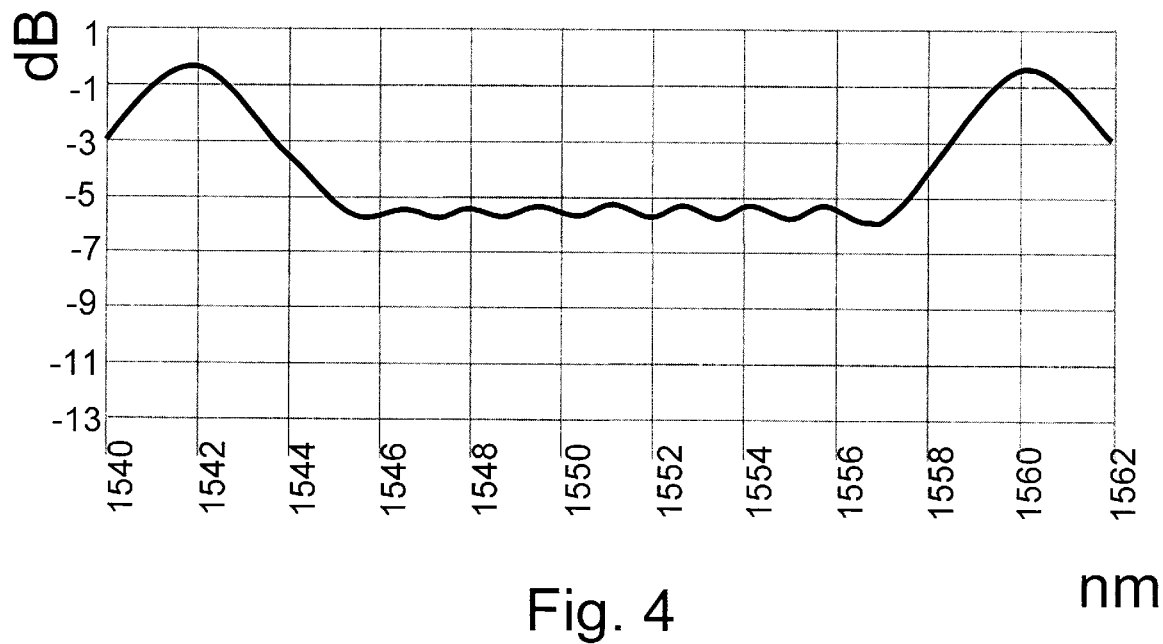
FIG. 4 is a graph of a filter performance shape of a de-emphasis filter for the optical transmission system of FIG. 1.

Filter 61 is positioned within the RB1 band amplifier chain for helping to equalize signal levels and SNRs at the system output across the RB1 band. In particular, filter 61 comprises a de-emphasis filter that attenuates the wavelength regions of the high amplification within the RB1 band. The de-emphasis filter, if used, may employ long period Bragg grating technology, split-beam Fourier filter, etc. As an example, the de-emphasis filter may have an operating wavelength range of 1541–1561 nm and have wavelengths of peak transmission at 1541–1542 nm and 1559–1560 nm, with a lower, relatively constant transmission for the wavelengths between these peaks. FIG. 4 illustrates the filter shape or relative attenuation performance of a preferred de-emphasis filter 61. The graph of FIG. 4 shows that the de-emphasis filter 61 has regions of peak transmission at around 1542 nm and 1560 nm, and a region of relatively constant or flat attenuation between about 1546 nm and 1556 nm. The de-emphasis filter 61 for erbium-doped fiber amplifiers need only add an attenuation of about 3–4 dB at wavelengths between the peaks to help flatten the gain response across the high band. The de-emphasis filter 61 may have an attenuation characteristic different from that depicted in FIG. 4 depending on the gain-flattening requirements of the actual system employed, such as the dopant used in the fiber amplifiers or the wavelength of the pump source for those amplifiers.

Alternatively, the de-emphasis filter 61 may be omitted and the de-emphasis operation may be obtained in the multiplexing section 11 of the first terminal site 10 by means of calibrated attenuation.

After passing through the amplifiers of TPA 12, the amplified BB, RB1 and RB2 bands output from amplifier sections 51, 52 and 53, respectively, are received by filter 54. Filter 54 is a band combining filter and may, for example, include two cascaded interferential three port filter (not shown), the first coupling the BB band with the RB1 band and the second coupling the BB/RB1 bands provided by the first filter with the RB2 band.

An optical monitor (not shown) and insertion for a service line, at a wavelength different from the communication channels, e.g. at 1480 nm, through a WDM 1480/1550 interferential filter (not shown) may also be added at the common port. The optical monitor detects optical signals to ensure that there is no break in optical transmission system 1. The service line insertion provides access for a line service module, which can manage through an optical supervisory channel the telemetry of alarms, surveillance, monitoring of performance and data, controls and housekeeping alarms, and voice frequency orderwire.

Figure 5:
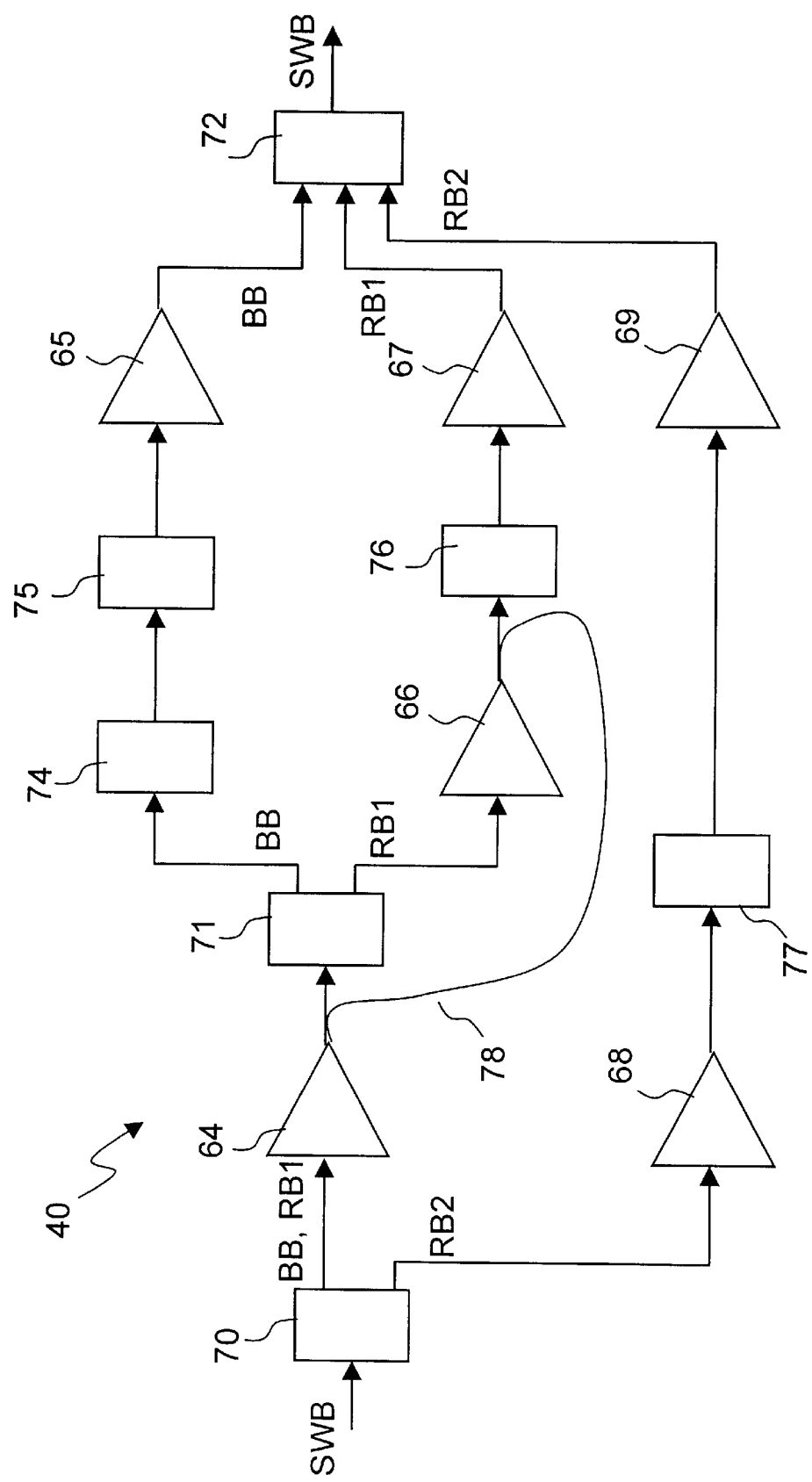
FIG. 5 is a detailed diagram of an intermediate station of the optical transmission system of FIG. 1.

The single wide-band output from filter 54 of TPA section 12 passes through a length of transmission fiber (not shown) of optical fiber line 30 such as 100 kilometers or more, which attenuates the signals within the single wide-band SWB. Consequently, line site 40 receives and amplifies the signals within the single wide-band SWB. As shown in FIG. 5, line site 40 includes several amplifiers (AMP) 64–69, three filters 70–72, an equalizing filter (EQ) 74 and three OADM stages 75–77.

Filter 70 receives the single wide-band SWB and separates the RB2 band from the BB and the RB1 bands. Amplifier 64 receives and amplifies the BB and the RB1 bands, whereas filter 71 receives the output from amplifier 64 and separates the BB band and the RB1 band. The BB band is equalized by equalizing filter 74, received by the first OADM stage 75 where predetermined signals are dropped and/or added, and further amplified by amplifier 65. The RB1 band, which has already passed through de-emphasis filter 61 in TPA 12, is first amplified by amplifiers 66, then received by the second OADM stage 76 where predetermined signals are dropped and/or added, and further amplified by amplifier 67. The RB2 band is first amplified by amplifier 68, then received by the third OADM stage 77 where predetermined signals are dropped and/or added, and further amplified by amplifier 69. The amplified BB, RB1 and RB2 bands are then recombined into the single wide-band SWB by filter 72.

Amplifier 64, which receives the single wide-band SWB, preferably comprises a single optical fiber amplifier that is operated in a linear regime. That is, amplifier 64 is operated in a condition where its output power is dependent on its input power. Depending on the actual implementation, amplifier 64 may alternatively be a single-stage or a multi-stage amplifier. By operating it in a linear condition, amplifier 64 helps to ensure relative power independence between the BB and RB1 band channels. In other words, with amplifier 64 operating in a linear condition, the output power (and signal-to-noise ratio) of individual channels in the one of the two sub-bands BB, RB1 does not vary significantly if channels in the other sub-band RB1, BB are added or removed. To obtain robustness with respect to the presence of some or all of the channels in a dense WDM system, first stage amplifier (such as amplifier 64 and amplifier 68) must be operated, in a line site 40, in an unsaturated regime, before extracting a portion of the channels for separate equalization and amplification. In a preferred embodiment, amplifiers 64 and 68 are erbium-doped fiber amplifiers, pumped in a co-propagating direction with a laser diode (not shown) operating at 980 nm pump to obtain a noise figure preferably less than 5.5 dB for each band.

Filter 71 may comprise, for example, a three-port device, preferably an interferential filter, having a drop port that feeds the BB band into equalizing filter 74 and a reflection port that feeds the RB1 band into amplifier 66.

Amplifier 66 is preferably a single erbium-doped fiber amplifier that is operated in saturation, such that its output power is substantially independent from its input power. In this way, amplifier 66 serves to add a power boost to the channels in the RB1 band compared with the channels in the BB band. Due to the greater number of channels in the RB1 band compared with the BB band in the preferred embodiment, i.e. forty-eight (48) channels as opposed to sixteen (16), the RB1 band channels typically will have had a lower gain when passing through amplifier 64. As a result, amplifier 66 helps to balance the power for the channels in the RB1 band compared with the BB band. Of course, for other arrangements of channels between the BB and the RB1 bands, amplifier 66 may not be required or may alternatively be required on the BB band side of line site 40.

With respect to the RB1 band of channels, amplifiers 64 and 66 may be viewed together as a two-stage amplifier with the first stage operated in a linear mode and the second stage operated in saturation. To help stabilize the output power between channels in the RB1 band, amplifier 64 and 66 are preferably pumped with the same laser diode pump source. In this manner, as described in EP 695049, the residual pump power from amplifier 64 is provided to amplifier 66. Specifically, line site 40 includes a WDM coupler positioned between amplifier 64 and filter 71 that extracts 980 nm pump light that remains at the output of amplifier 64. This WDM coupler may be, for example, model number SWDMCPR3PS110 supplied by E-TEK DYNAMICS, INC., 1885 Lundy Ave., San Jose, Calif. (USA). The output from this WDM coupler feeds into a second WDM coupler of the same type and positioned in the optical path after amplifier 66. The two couplers are joined by an optical fiber 78 that transmits the residual 980 nm pump signal with relatively low loss. The second WDM coupler passes the residual 980 nm pump power into amplifier 66 in a counter-propagating direction.

From amplifier 66, RB1 band signals are conveyed to OADM stage 76 of a known type or of the type described in EP patent application No. 98110594.3 in the name of the Applicant. From OADM stage 76, RB1 band signals are fed to amplifier 67. For the preferred erbium-doped fiber amplifier, amplifier 67 has a pump wavelength of, for example, 1480 nm from a laser diode source (not shown) having a pump power in excess of the laser (not shown) that drives amplifiers 64 and 66. The 1480 nm wavelength provides good conversion efficiency for high output power output compared with other pump wavelengths for erbium-doped fibers. Alternatively, a high power 980 nm pump source or a group of multiplexed pump sources, such as one at 975 nm and another at 986 nm, or two polarization multiplexed pump sources at 980 nm, could be used to drive amplifier 67. Amplifier 67 preferably operates in saturation to provide the power boost to the signals within the RB1 band, and if desired, may comprise a multi-stage amplifier.

After passing through amplifier 64 and filter 71, the BB band enters equalizing filter 74. As discussed above, the gain characteristic for the erbium-doped fiber spectral emission range has a peak or hump in the BB band region, but remains fairly flat in the RB1 band region. As a result, when the BB band or the single wide-band SWB (which includes the BB band) is amplified by an erbium-doped fiber amplifier, the channels in the BB band region are amplified unequally. Also, as discussed above, when equalizing means have been applied to overcome this problem of unequal amplification, the equalizing has been applied across the entire spectrum of channels, resulting in continued gain disparities. However, by splitting the spectrum of channels into a BB band and a RB1 band, equalization in the reduced operating area of the BB band can provide proper flattening of the gain characteristic for the channels of the BB band.

In a preferred embodiment, the equalizing filter 74 comprises a two-port device based on long period chirped Bragg grating technology that gives selected attenuation at different wavelengths. For instance, equalizing filter 74 for the BB band may have an operating wavelength range of 1529 nm to 1536 nm, with a wavelength at the bottom of the valley at between 1530.3 nm and 1530.7 nm. Equalizing filter 74 need not be used alone and may be combined in cascade with other filters (not shown) to provide an optimal filter shape and thus, gain equalization for the particular amplifiers used in the WDM system 1. Equalizing filter 74 may be manufactured by one skilled in the art, or may be obtained from numerous suppliers in the field. It is to be understood that the particular structure used for the equalizing filter 74 is within the realm of the skilled artisan and may include, for instance, a specialized Bragg grating like a long period grating, an interferential filter, or Mach-Zehnder type optical filters.

From equalizing filter 74, BB band signals are conveyed to OADM stage 75, which is, for example, of the same type of OADM stage 76, and then to amplifier 65. With the preferred erbium-doped fiber amplifier, amplifier 65 has a pump wavelength of 980 nm, provided by a laser diode source (not shown) and coupled via a WDM coupler (not shown) to the optical path for pumping the amplifier 65 in a counter-propagating direction. Since the channels in the BB band pass through both amplifier 64 and amplifier 65, equalizing filter 74 may compensate for the gain disparities caused by both amplifiers. Thus, the decibel drop for equalizing filter 74 should be determined according to the overall amplification and line power requirements for the BB band. The amplifier 65 preferably operates in saturation to provide a power boost to the signals in the BB band, and may comprise a multi-stage amplifier if desired.

The RB2 band is received from fiber amplifier 68, which is, preferably, an erbium doped fiber amplifier pumped with a 980 nm or a 1480 nm pump light, depending on the system requirements. From amplifier 68, RB2 band channels are conveyed to OADM stage 77, which is, for example, of the same type of OADM stages 75 and 76, and then fed to amplifier 69. Amplifier 69 is an erbium doped amplifier adapted to amplify the RB2 band and will be described in details with reference to FIG. 8.

After passing through amplifiers 65, 67 and 69 respectively, the amplified BB, RB1 and RB2 bands are then recombined by filter 72 into the single wide-band SWB. Like filter 54 of FIG. 3, filter 72 may, for example, include two cascaded interferential three port filter (not shown), the first coupling the BB with the RB1 bands and the second coupling the BB and RB1 bands provided by the first filter with the RB2 band.

Like TPA section 12, line site 40 may also include an optical monitor and a service line insertion and extraction (not shown) through, e.g., a WDM 1480/1550 interferential filter (not shown). One or more of these elements may be included at any of the interconnection points of line site 40.

Besides amplifiers 64–69, filters 70–72 and 74, and OADM stages 75–77, line site 40 may also include a dispersion compensating module (DCM) (not shown) for compensating for chromatic dispersion that may arise during transmission of the signals along the long-distance communication link. The DCM (not shown) is preferably comprised of subunits coupled upstream one or more of amplifiers 65, 67, 69 for compensating the dispersion of channels in one or more than one of the BB, RB1, RB2 bands, and may also have several forms. For example, the DCM may have an optical circulator with a first port connected to receive the channels in the three bands BB, RB1 and RB2. A chirped Bragg grating may be attached to a second port of the circulator. The channels will exit the second port and be reflected in the chirped Bragg grating to compensate for chromatic dispersion. The dispersion compensated signals will then exit a next port of the circulator for continued transmission in the WDM system. Other devices besides the chirped Bragg grating, such as a length of dispersion compensating fiber, may be used for compensating the chromatic dispersion. The design and use of the DCM section are not limiting the present invention and the DCM section may be employed or omitted in the WDM system 1 depending on overall requirements for system implementation.

After the line site 40, the combined single wide-band SWB signal passes through a length of long-distance optical transmission fiber of optical fiber line 30. If the distance between the first and the second terminal site 10, 20 is sufficiently long to cause attenuation of the optical signals, i.e. 100 kilometers or more, one or more additional line sites 40 providing amplification may be used. In a practical arrangement, five spans of long-distance transmission fiber are used (each having a power loss of 0.22 dB/km and a length such as to provide a total span loss of approximately 25 dB), separated by four amplifying line site 40.

Figure 6:
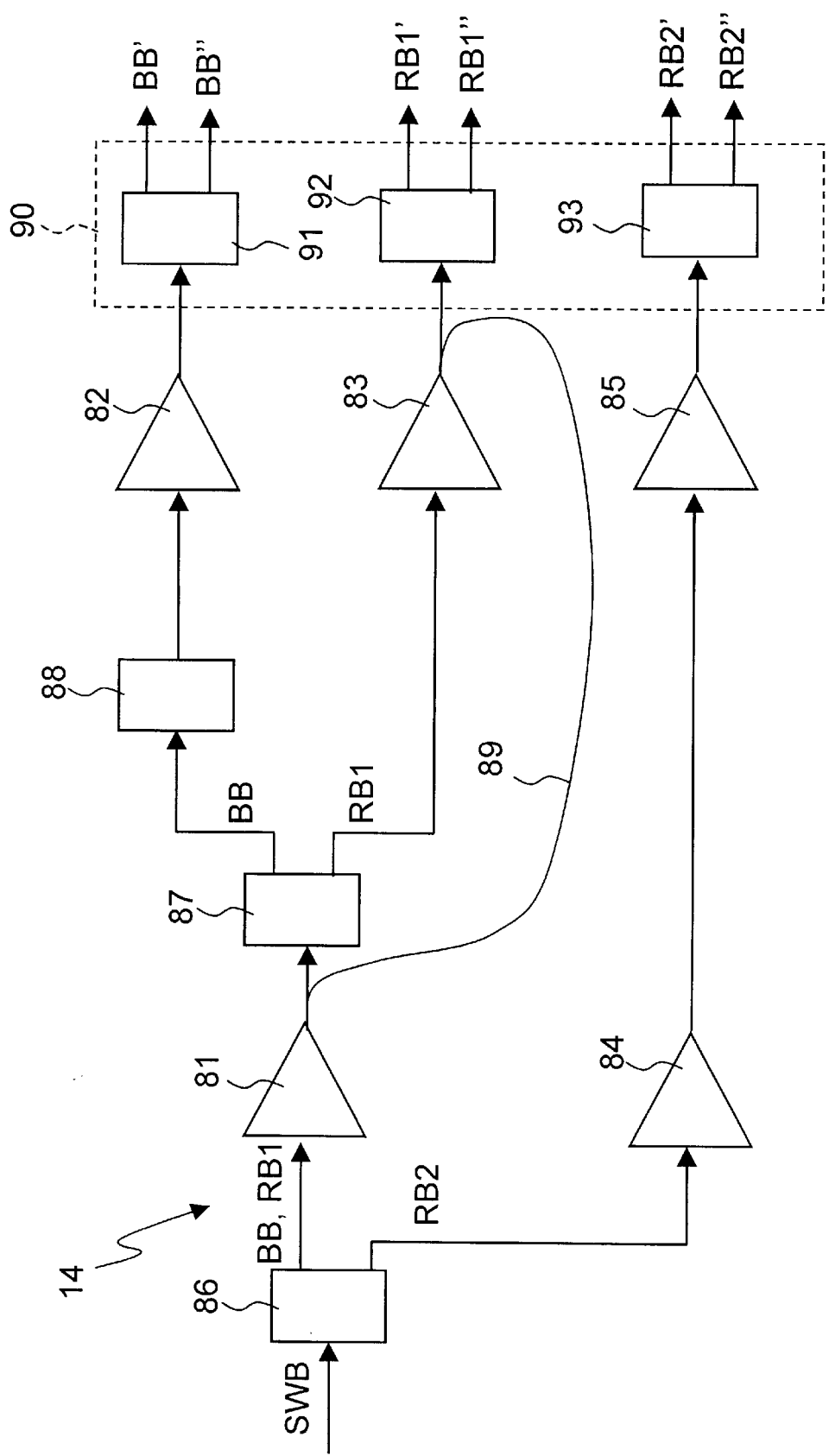
FIG. 6 is a detailed diagram of a receiver pre-amplifier section of the optical transmission system of FIG. 1.

Following the final span of transmission fiber, RPA section 14 receives the single wide-band SWB from last line site 40 and prepares the signals of the single wide-band SWB for reception and detection at the end of the communication link. As shown in FIG. 6, RPA section 14 may include amplifiers (AMP) 81–85, filters 86 and 87, an equalizing filter 88 and, if necessary, three router modules 91–93.

Filter 86 receives the single wide-band SWB and separates the RB2 band from the BB and RB1 bands. Amplifier 81 is preferably doped with erbium and amplifies the BB and RB1 bands to help improve the signal-to-noise ratio for the channels in the BB and RB1 bands. Amplifier 81 is pumped, for example, with a 980 nm pump or with a pump at some other wavelength to provide a low noise figure for the amplifier. The BB and RB1 bands are in turn separated by filter 87.

As with TPA section 12 and line site 40, amplifier 82 and 83 amplify the BB band and, respectively, the RB1 band, with a 980 nm pumping. To help stabilize the output power between channels in the RB1 band, amplifier 81 and 83 are preferably pumped with the same 980 nm laser diode pump source, by using a joining optical fiber 89 that transmits the residual 980 nm pump signal with relatively low loss. Specifically, amplifier 81 is associated with a WDM coupler, positioned between amplifier 81 and filter 87, that extracts the 980 nm pump light that remains at the output of amplifier 81. This WDM coupler may be, for example, model number SWDMCPR3PS110 supplied by E-TEK DYNAMICS, INC., 1885 Lundy Ave., San Jose, Calif. (USA). The output from this WDM coupler feeds into a second WDM coupler of the same type and positioned in the optical path after amplifier 83. The two couplers are joined by an optical fiber 89 that transmits the residual 980 nm pump signal with relatively low loss. The second WDM coupler passes the residual 980 nm pump power into amplifier 83 in a counter-propagating direction. Thus, amplifiers 81–83, filter 87 and equalizing filter 88 perform the same functions as amplifiers 64, 65 and 67, filter 71, and equalizing filter 74, respectively, of line site 40 and may comprise the same or equivalent parts depending on overall system requirements.

Amplifier 84 is coupled to filter 86 to receive and amplify the RB2 band. Amplifier 84 is, for example, an erbium-doped amplifier identical to the amplifier 68 of FIG. 5. RB2 band channels are then received by amplifier 85 that is, preferably, according to the invention, an erbium-doped amplifier that will be described in details with reference to FIG. 8.

RPA section 14 further comprises a routing stage 90, which permits to adapt the channel spacing within the BB, RB1 and RB2 bands to the channel separation capability of demultiplexing section 15. In particular, if the channel separation capability of demultiplexing section 15 is for a relatively wide channel spacing (e.g. 100 GHz grid) while channels in WDM system 1 are densely spaced (e.g. 50 GHz), then RPA section 14 could include the routing stage 90 shown in FIG. 6. Other structures may be added to RPA section 14 depending on the channel separation capability of demultiplexing section 15.

Routing stage 90 includes three router modules 91–93. Each router module 91–93 separates the respective band into two sub-bands, each sub-band including half of the channels of the corresponding band. For example, if the BB band includes sixteen (16) channels $\lambda_1$–$\lambda_{16}$, each separated by 50 GHz, then router module 91 would split the BB band into a first sub-band BB' having channels $\lambda_1, \lambda_3, \ldots, \lambda_{15}$ separated by 100 GHz and a second sub-band BB" having channels $\lambda_2, \lambda_4, \ldots, \lambda_{16}$ separated by 100 GHz and interleaved with the channels in the sub-band BB'. In a similar fashion, router modules 92 and 93 would split the RB1 band and the RB2 band, respectively, into first sub-bands RB1' and RB2' and second sub-bands RB1" and RB2".

Each router module 91–93 may, for example, include a coupler (not shown) that has a first series of Bragg gratings attached to a first port and a second series of gratings attached to a second port. The Bragg gratings attached to the first port would have reflection wavelengths that correspond to every other channel (i.e. the even channels), while the Bragg gratings attached to the second port would have reflection wavelengths that correspond to the remaining channels (i.e. the odd channels). This arrangement of gratings will also serve to split the single input path into two output paths with twice the channel-to-channel spacing.

Figure 7:
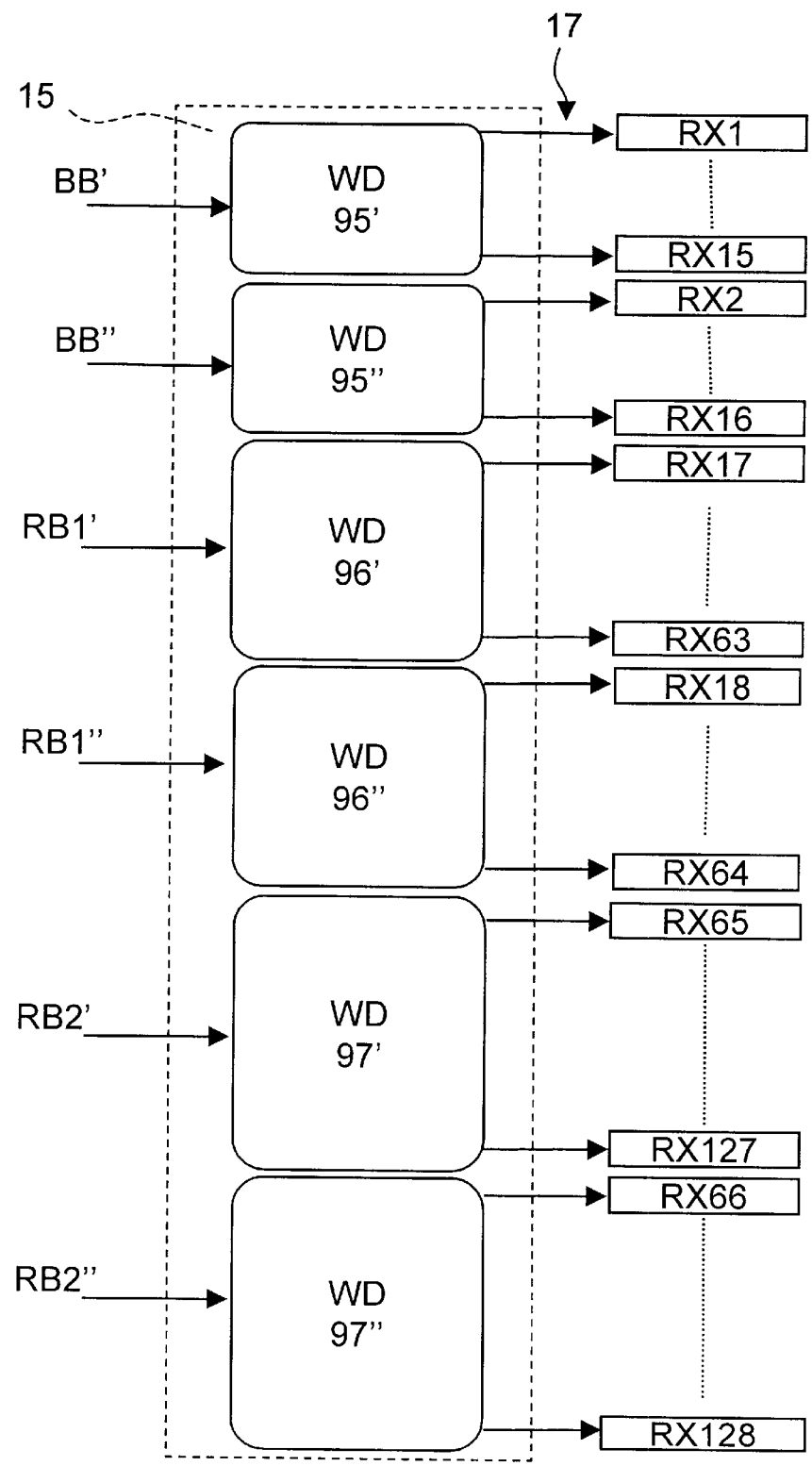
FIG. 7 is a detailed diagram of a multiplexing section of the optical transmission system of FIG. 1.

After passing through RPA section 14, the BB, RB1 and RB2 bands or their respective sub-bands are received by demultiplexing section 15. As shown in FIG. 7, demultiplexing section 15 includes six wavelength demultiplexers (WDs) 95', 95", 96', 96", 97', 97" which receive the respective sub-bands BB', BB", RB1', RB1", RB2' and RB2" and generate the output channels 17. Demultiplexing section 15 further includes receiving units Rx1–Rx128 for receiving the output channels 17.

The wavelength demultiplexers preferably comprise arrayed waveguide grating devices, but alternate structures for achieving the same or similar wavelength separation are contemplated. For instance, one may use interferential filters, Fabry-Perot filters, or in-fiber Bragg gratings in a conventional manner to demultiplex the channels within the sub-bands BB', BB", RB1', RB1", RB2', RB2".

In a preferred configuration, demultiplexer section 15 combines interferential filter and AWG filter technology. Alternatively, one may use Fabry-Perot filters or in-fiber Bragg gratings. WDs 95', 95", which are preferably eight channel demultiplexers with interferential filters, receive and demultiplex first sub-band BB' and second sub-band BB", respectively. Specifically, WD 95' demultiplexes channels $\lambda_1, \lambda_3, \ldots, \lambda_{15}$, and WD 95" demultiplexes channels $\lambda_2, \lambda_4, \ldots, \lambda_{16}$. Both WD 95' and WD 95", however, may be 1×8 type AWG 100 GHz demultiplexers. Similarly, WDs 96' and 96" receive and demultiplex first sub-band RB1' and second sub-band RB1", respectively, to produce channels $\lambda_{17}$–$\lambda_{64}$ and WDs 97' and 97" receive and demultiplex first sub-band RB2' and second sub-band RB2", respectively, to produce channels $\lambda_{65}$–$\lambda_{128}$. Both WD 96' and WD 96" may be 1×32 type AWG 100 GHz demultiplexers that are underequipped to use only twenty-four of the available demultiplexer ports and both WD 97' and WD 97" may be 1×32 type AWG 100 GHz demultiplexers that uses all the available demultiplexer ports. Output channels 17 are composed of the individual channels demultiplexed by WDs 95', 95", 96', 96", 97', 97", and each channel of output channels 17 is received by one of receiving units Rx1–Rx128.

Figure 8:
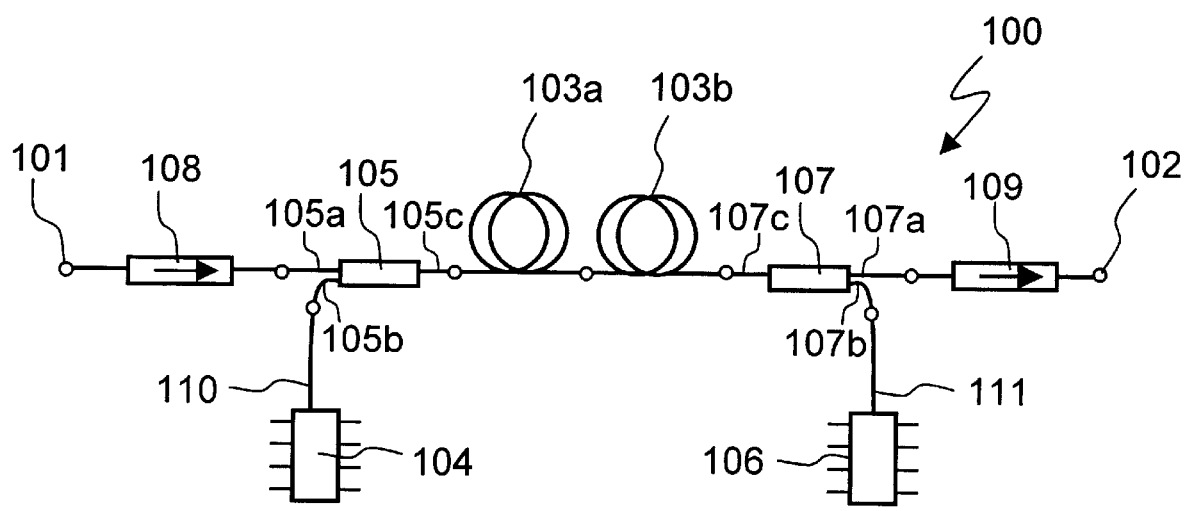
FIG. 8 is a schematic representation of an optical amplifying unit according to the present invention.
Figure 9:
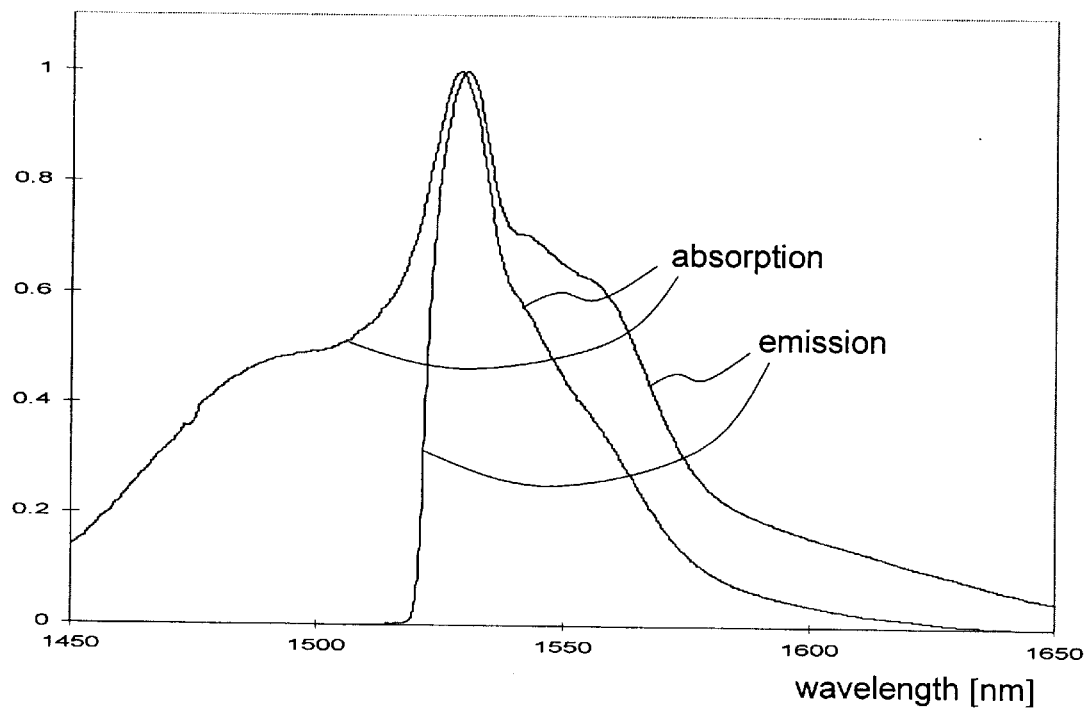
FIG. 9 shows the absorption and emission spectra of an active fiber considered for numerical simulation of the amplifying unit of the present invention.

FIG. 8 illustrates, with number 100, an optical amplifier (or optical amplifying unit) according to the present invention. Optical amplifier 100 can be used in the optical transmission system 1 to amplify signals in the RB2 band in the amplifier sections 53 (FIG. 3), 69 (FIG. 5) and 85 (FIG. 6).

Amplifier 100 is a bidirectional pumped optical amplifier and includes:

- an input port 101 for the input of optical signals to be amplified;
- an output port 102 for the output of the amplified optical signals;
- a first and a second active fiber 103a, 103b serially connected, defining a first and a second amplification stage, respectively; fiber 103a being optically coupled to the input port 101 to receive signals to be amplified and fiber 103b being optically coupled to the output port 102 to provide the amplified output signals;
- a first pump source 104 optically coupled to the first active fiber 103a by means of a first optical coupler 105 and adapted to feed a first pump radiation to the first active fiber 103a, preferably in a co-propagating direction with respect to transmitted signals;
- a second pump source 106 optically coupled to the second active fiber 103b by means of a second optical coupler 107 and adapted to feed a second pump radiation to the second active fiber 103b, preferably in a counter-propagating direction with respect to transmitted signals.

Amplifier 100 may also comprise a first optical isolator 108 of a known type positioned between input 101 and the first coupler 105, to allow light transmission only from input 101 to coupler 105, and/or a second optical isolator 109 of a known type positioned between the second coupler 107 and output 102, to allow light transmission only from the second coupler 107 to output 102. A further optical isolator (not shown) may be interposed between the first and the second fiber 103a, 103b.

In a second possible embodiment not shown, the second pump source 106 and the second optical coupler 107 are absents, and the amplifier is pumped co-directionally with respect to transmitted signals.

In a less preferred embodiment, the first pump source 104 and the first optical coupler 105 are absents, and the amplifier is pumped counter-directionally with respect to transmitted signals.

Further possible embodiments may include one of the above described pumping architectures, in which instead of a pump source (for co-propagantly and/or counter-propagantly pumping) there is a plurality of wavelength-multiplexed pump sources, opportunely wavelength shifted the one to the other.

Active fibers 103a and 103b are single-mode silica fiber doped with erbium and aluminum, each having a length preferably comprised between 20 m and 70 m, a numeric aperture NA preferably comprised between 0.26 and 0.31 and a cut-off wavelength preferably comprised between 1000 nm and 1200 nm. The erbium concentration is preferably comprised between $0.8 \cdot 10^{25}$ ions/m$^3$ and $1.6 \cdot 10^{25}$ ions/m³ and the aluminum concentration is preferably comprised between 2% and 10% weight molar concentration.

The first coupler 105 may be a micro-optic interferential WDM coupler, including:

- a first access fiber 105a optically coupled to the input port 101 to receive the signals (in the RB2 band channels) to be amplified;
- a second access fiber 105b optically coupled to the first pump source 104 by means of a single-mode optical fiber 110, to receive the first pump radiation;
- a third access fiber 105c optically coupled to the first active fiber 103a to feed to it the optical signals to be amplified, together (and in a same propagation direction) with the first pump radiation.

The first coupler 105 further includes a converging lens system (not shown), to opportunely direct the light beams among its access fibers, and a selective-reflection surface (not shown), e.g. a dichroic mirror. The actual slope of the reflection surface inside the coupler depends on the direction of the incoming optical beams carrying the signal and the pump radiation. Preferably, the selective-reflection surface in coupler 105 is transparent for the wavelengths of the RB2 band channels and reflecting for the wavelength of the first pumping radiation. In this way, the RB2 band channels pass through the reflecting surface substantially without losses while the first pump radiation is reflected by the reflecting surface into the core of the first active fiber 103a. Alternatively, the first coupler 105 may include a selective-reflection surface that is reflecting for the wavelengths of the RB2 band channels and transmissive for the wavelength of the first pumping radiation.

The first coupler 105 has preferably an insertion loss for the optical signals not greater than 0.6 dB. For example, the first coupler 105 may be model MWDM-45/54 made by Oplink. As a further possibility, the first coupler 105 may be a fused-fiber coupler, in which case it has a fourth access fiber (not shown) having a free end that is low-reflection terminated.

The second coupler 107 may be a micro-optic interferential WDM coupler of the same time of the first coupler 105, including:

- a first access fiber 107a optically coupled to the output port 102 to feed to it the amplified signals;
- a second access fiber 107b optically coupled to the second pump source 106 by means of an optical fiber 111, to receive the corresponding pump radiation;
- a third access fiber 107c optically coupled to the second active fiber 103b to receive from it the amplified optical signals and to feed to it the pump radiation generated by the second pump source 106.

Alternatively, the second coupler 107 may be a fused-fiber coupler, in which case it has a fourth access fiber (not shown) having a free end that is low-reflection terminated.

Advantageously, pump sources 104 and 106 may be semiconductor laser diodes and provide respective pump radiations at a predetermined wavelength in the range between 1400 nm and 1480 nm, adapted to excite the Er ions in the active fibers 103a and 103b. The pumping power provided by the pump sources 104 and 106 is preferably comprised between 30 and 100 mW. The pump radiations provided to fibers 103a and 103b by pump sources 104 and 106 have respective wavelengths below 1480 nm, preferably between 1400 nm and 1470 nm, more preferably between 1430 nm and 1460 nm. The emission wavelength of pump sources 104 and 106 can be selected by controlling its operative temperature.

Pump sources 104 and 106 may be, for example, model number SLA5600-DA supplied by SUMITOMO ELECTRIC INDUSTRIES, Ltd.

NUMERICAL SIMULATION

A spectral model of erbium-doped fiber amplifiers (EDFAs) has been used to study the efficiency characteristics of the erbium amplifier of the invention in L-band, when the pump wavelength is 1480 nm. In the simulation, the amplifier of FIG. 8 was considered, under operative conditions typical for the pre-amplifier section in the receiving site (i.e. section 85 of FIG. 6).

Two numerical simulations have been performed in order to evaluate the amplifier's performances as a function of the fiber physical and chemical characteristics, in particular as a function of the numerical aperture NA and of the Al concentration.

First Simulation—effects of NA

The total output power of the amplifier has been evaluated as a function of the NA, taking constant the cut-off wavelength, the Al concentration (and, then, the shape of the absorption and emission spectra), the peak absorption and the total length of the serially arranged active fibers. In particular, the following values were considered:

cut-off wavelength=1128 nm;

Al concentration=2% (weight molar concentration)

peak absorption=15 dB/m total length of active fibers=40 m (20 m+20 m)

The numerical aperture NA was varied between 0.22 and 0.32.

Figure 10:
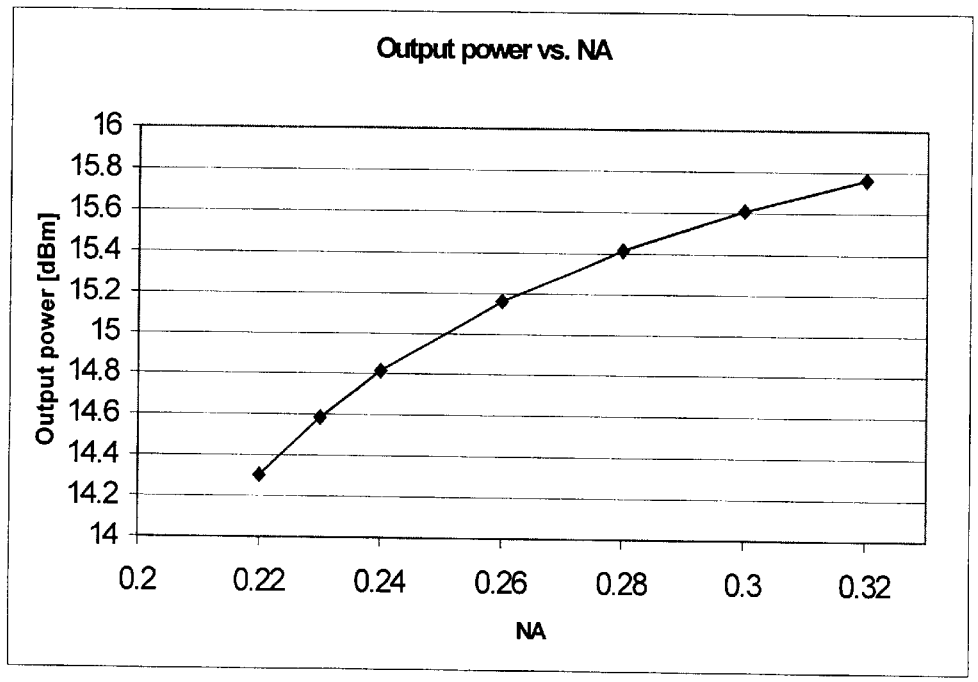
FIGS. 10 and 11 illustrate the results of numerical simulation.

FIG. 10 shows the result of the first simulation, It can be observed that, keeping constant all the other parameters, an increase of the NA causes an increase of the power conversion efficiency. In the present case, the power conversion efficiency increase from 33% for NA=0.22 to 47% for NA=0.32.

The Applicant believes that the above advantage is also valid for pumping wavelengths below 1480 nm.

Second Simulation—effects of Al concentration

In this second simulation, all the waveguide parameters were kept constant, and the effects of an Al concentration variation on the absorption and emission spectra were estimated. In particular, the following values were considered:

cut-off wavelength=1128 nm;

NA=0.28;

peak absorption=13.7 dB/m;

total length of active fibers=50 m (25 m+25 m).

Figure 11:
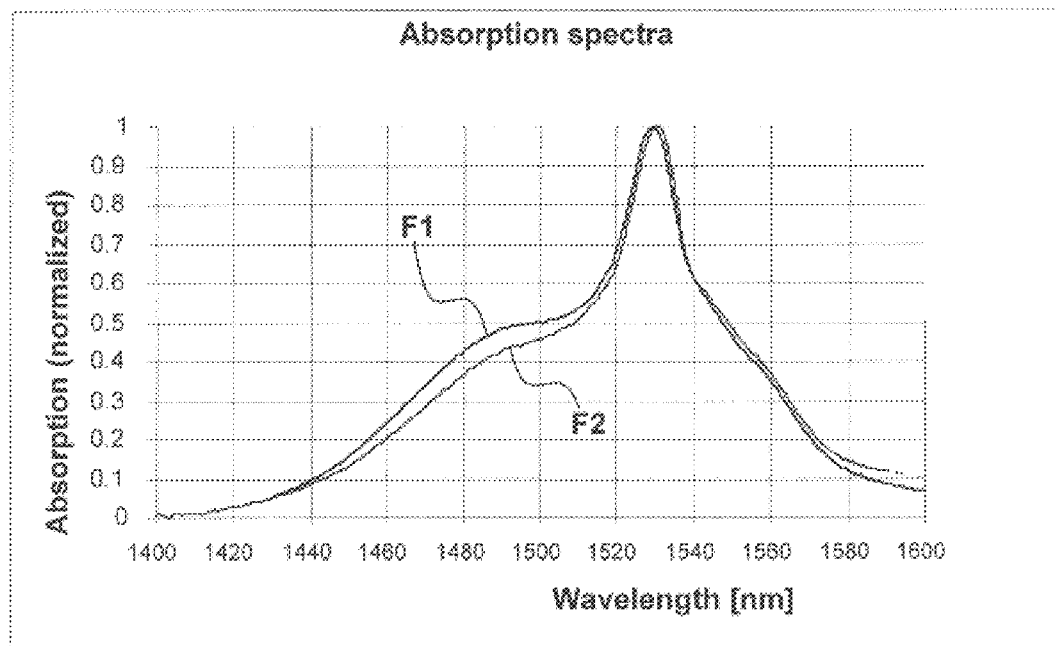

The Al concentrations were considered at 2% and 10% weight molar concentration. FIG. 11 shows the normalized absorption spectra of active fibers F1 and F2 having respectively 2% and 10% of Al.

It was found that a decrease of the Al concentration from 10% to 2% (weight molar concentration) produces an increase of the output power from 15.3 dBm to 16.1 dBm, which correspond to an increase of the power conversion efficiency from 42.4% to 50.5%.

The above results demonstrate that both the increase of NA and the decrease of the Al concentration lead to an increase of the power conversion efficiency. An upper limit for the NA shall be established in order to maintain the splice losses between the active fiber and fiber 105c and 107c (FIG. 8) (typically SM fibers when the amplifier is 1480 nm pumped) below predetermined values. A lower limit for the Al concentration shall be chosen so as to guarantee a high solubility of erbium ions in the silica matrix in order to prevent erbium ions clustering (which, as known, causes an efficiency reduction).

The Applicant observes that the best performances are obtained when the said parameters are comprised in the following ranges:

Al concentration between 1% and 6% weight molar concentration, preferably between 2% and 3% weight molar concentration;

NA between 0.25 and 0.32, preferably between 0.27 and 0.3.

EXPERIMENTAL MEASURES

The Applicant has performed experimental tests to study the effects of the 1480 nm pump detuning on the amplifier's performances, in particular on the gain curve and on the noise figure. In particular, in a first experiment, the Applicant has considered the first stage of the amplifier (i.e. only fiber 103a) with a co-propagating pumping. In a second and a third experiments, he has considered the complete two-stage amplifier, operated as a pre-amplifier with five and thirty-two channels, respectively. In a fourth experiment, the complete amplifier was operated as a booster amplifier with five channels. In a fifth experiment, the effects of pump detuning on the counter-propagating ASE were assessed.

Following the results of the numerical simulation, two active fibers F'1 and F'2, having the same spectral characteristics as fibers F1 and F2 and the physical characteristics reported in following table, have been manufactured by the MCVD method and solution doping technique and used for the experiments.

|  | NA | cutoff wavel. [nm] | erbium absor. [dB/m] | Al % [weight molar conc.] | loss at 1200 nm [dB/Km] | peak absor. [dB/m] | peak absor./ absor. at 1480 nm |
|---|---|---|---|---|---|---|---|
| F'1 | 0.23 | 1107 | 15.2 | 10 | 51 | 15.2 | 2.3 |
| F'2 | 0.265 | 1147 | 18.3 | 2 | 21 | 18.3 | 2.8 |

The Applicant observed that, on the base of the simulation results, it can be derived that fiber F'2 has better parameters than fiber F'1 because the NA is higher and the aluminum concentration is lower, while the cut-off wavelength is substantially the same.

First Experiment (single-stage pre-amplifier)

Figure 12:
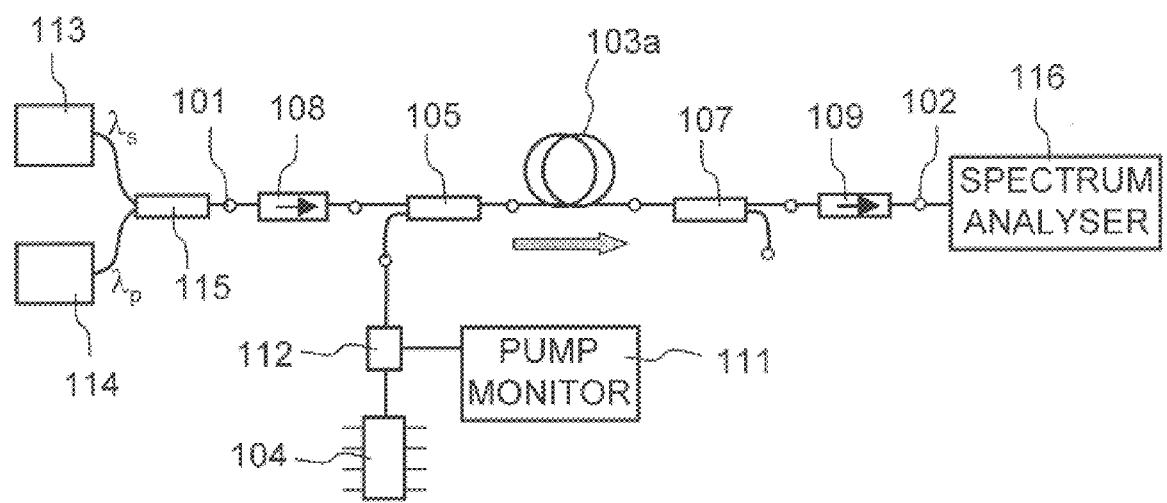
FIG. 12 illustrates a first experimental setup to test a single-stage amplifier according to the present invention.

FIG. 12 shows the experimental setup used to test the first stage of the amplifier (i.e. first fiber 103a). The second fiber 103b and the second coupler 106 were absent.

The setup includes:

a pump monitor 111 coupled to the pump source 104 by means of a 99/1 splitter 112, in order to receive 1% of the optical power generated by the pump source 104 (the remaining 99% being fed to the active fiber 103);

two signal sources 113 and 114, the first being adapted to generate a high-power saturating signal for fiber 103a at a predetermined wavelength $\lambda_s$, and the second being adapted to generate a low-power probe signal at a tunable wavelength $\lambda_p$ in the range 1575–1605 nm; a WDM coupler 1115 coupled to the signal sources 113 and 114 is adapted to multiplex the saturating and the probe signals for their simultaneous feeding to the input 101 of the amplifier; and a spectrum analyzer 116 coupled to the output 102 of the amplifier and suitable to analyze the output signal.

The pump source 104 is a laser diode produced by Anritzu (JP). The power of the pump radiation fed to the active fiber is 40 mW. This power was continuously monitored by means of the pump monitor.

Fiber 103a has the characteristics of fiber F'1 and its length was chosen in order to have total peak absorption of 400 dB.

The probe signal wavelength was varied from 1575 nm to 1605 nm, with 2 nm steps. The wavelength of the saturating signal was fixed at 1580 nm. The input power of the saturating signal and the probe signal were −7 dBm (which is a typical operative value for the total input power when the amplifier is used as a pre-amplifier in the receiving site) and −30 dBm, respectively.

The output signal was detected by the spectrum analyzer 116, which provided the power of the probe signal and, accordingly, its amplification by the active fiber 103a. Moreover, the spectrum analyzer 116 detected the ASE at the wavelength of the probe signal in order to evaluate the signal-to-noise ratio and, accordingly, the noise figure. The measures were repeated for different wavelengths of the pump radiation, obtained by varying the operative temperature of the laser diode. In particular, the following pump wavelengths were used: 1466 nm, 1471 nm, 1475 nm and 1480 nm. The input power of the pump radiation was held constant.

Figure 13:
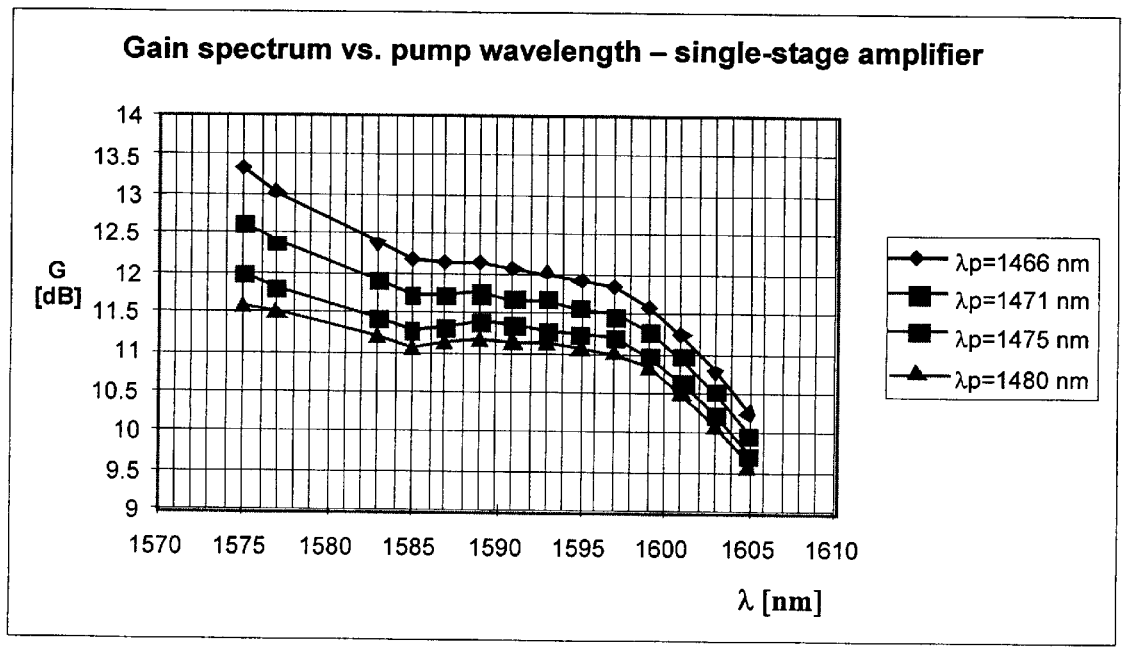
FIG. 13 shows the result of an experimental measure performed by means of the setup of FIG. 12.

FIG. 13 shows the gain curve detected by the spectrum analyzer 116 in the above mentioned experimental conditions. These results demonstrate that, starting from $\lambda_p$=1480 nm, a decrease of the pump wavelength causes an increase of the maximum gain (localized at about 1575 nm), from about 11.5 dB to about 13.3 dB, which corresponds to a percent variation of about 41%. A lower variation (about 16%) is detected at the opposite end of the considered band, i.e. at 1605 nm.

Second Experiment (double stage pre-amplifier—5 channels)

FIG. 14 shows the experimental setup to test amplifier 100 in its complete configuration, when operated as a pre-amplifier (as in amplifier section 85 of FIG. 6). This setup differ from the one of FIG. 12 in that it includes a 50/50 splitter 117 coupled to laser diode 104 and adapted to split the pump radiation so as to provide 50% of it to fiber 103a in a co-propagating direction via coupler 105, and 50% to fiber 103b in a counter-propagating direction via coupler 107. A further difference is the presence, in place of signal sources 113, 114, of a plurality of signal sources 118-1, 118-2, . . . , 118-N, adapted to feed to the amplifier signals at respective wavelengths $\lambda_1, \lambda_2, \ldots, \lambda_N$ within the L-band. A multiplexer 119 is used to multiplex the N signals into a single fiber coupled the input 101.

In the experiment here considered, the number of signal sources (i.e. the number of channels) was five and the corresponding wavelengths were 1575 nm, 1583 nm, 1590 nm, 1596 nm and 1603 nm. The total signal power at the input 101 was −8 dBm and the pump power fed in each direction (co-propagating and counter-propagating was 40 mW.

The signal amplification and the ASE were detected by the spectrum analyzer 116. The signal-to-noise ratio and the noise figure were derived from the detected ASE. The measures were performed on both fibers F'1 and F'2.

Figure 15:
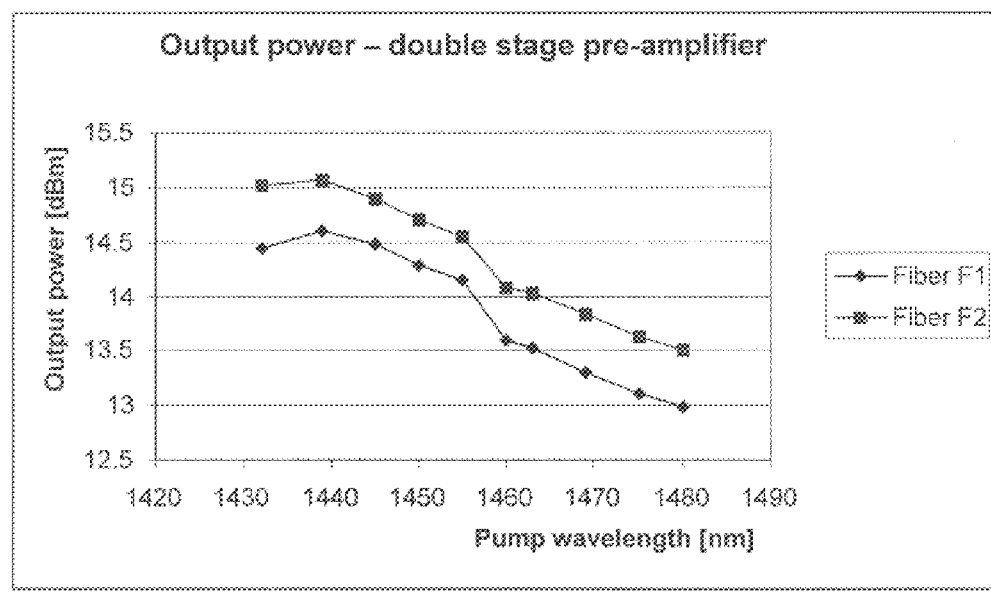

FIG. 15 illustrates the output power detected for both fiber F'1 and fiber F'2 and shows that fiber F'2 allows to reach a greater output signal power.

Figure 16:
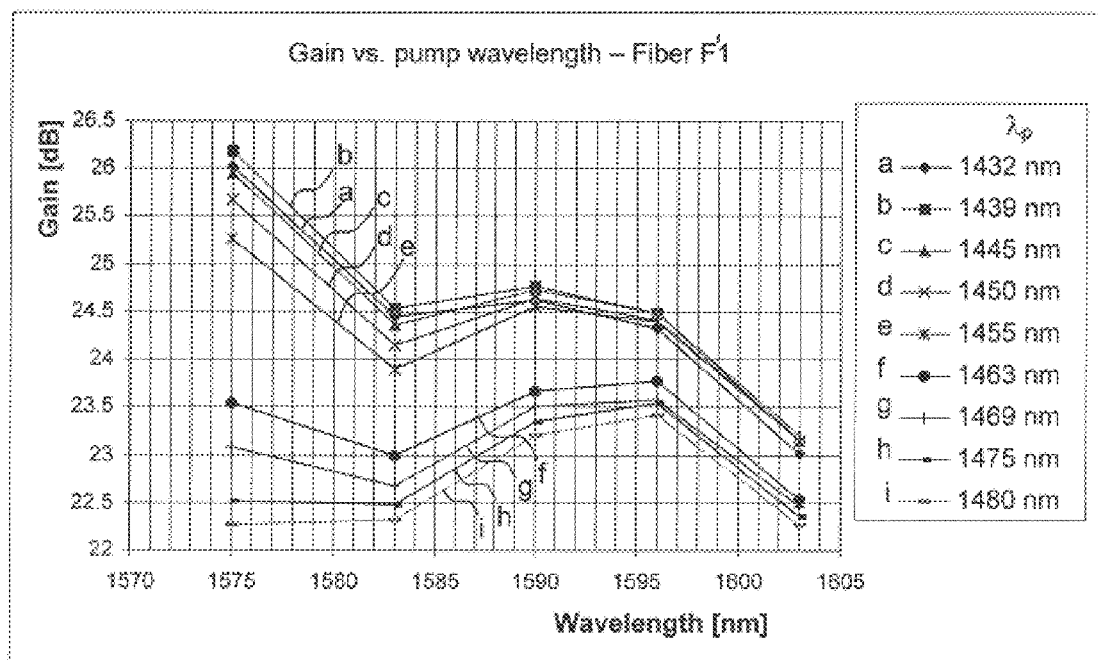
Figure 17:
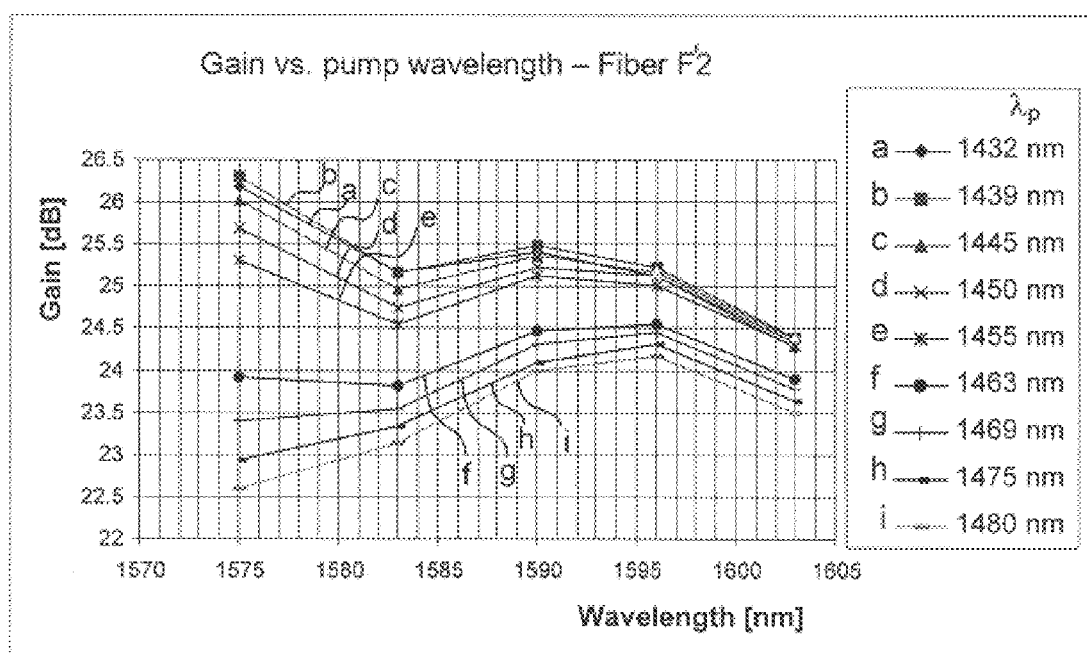

FIGS. 16 and 17 show the dependency on the pump wavelength of the gain curves of the double-stage amplifier including fiber F'1 and fiber F'2, respectively.

Figure 18:
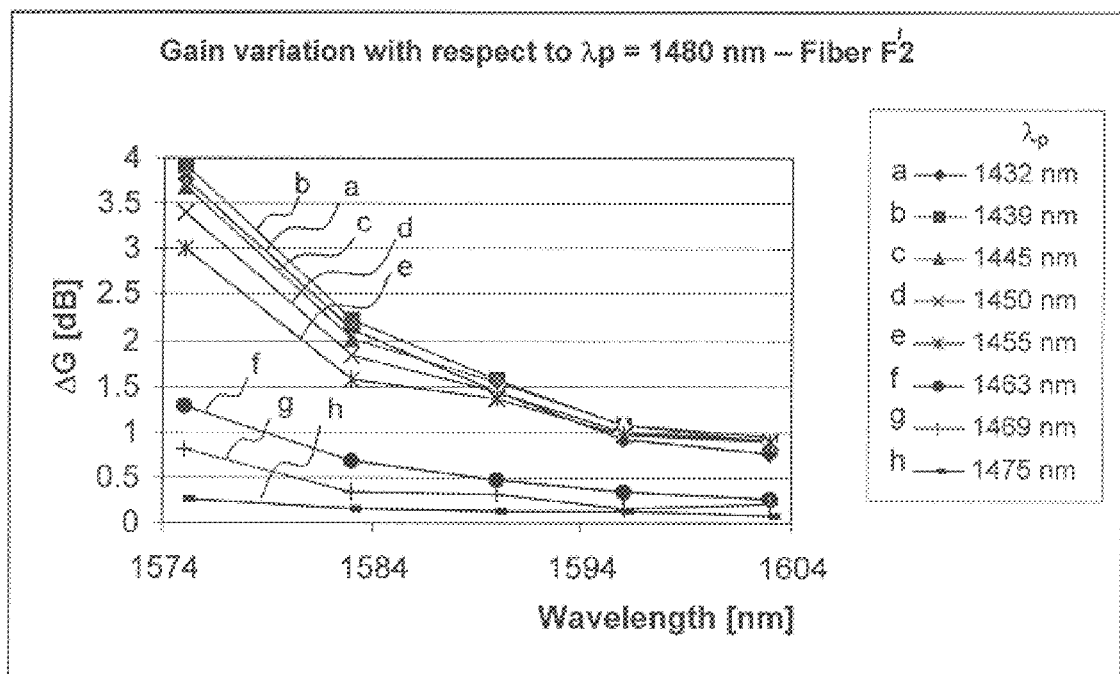
Figure 19:
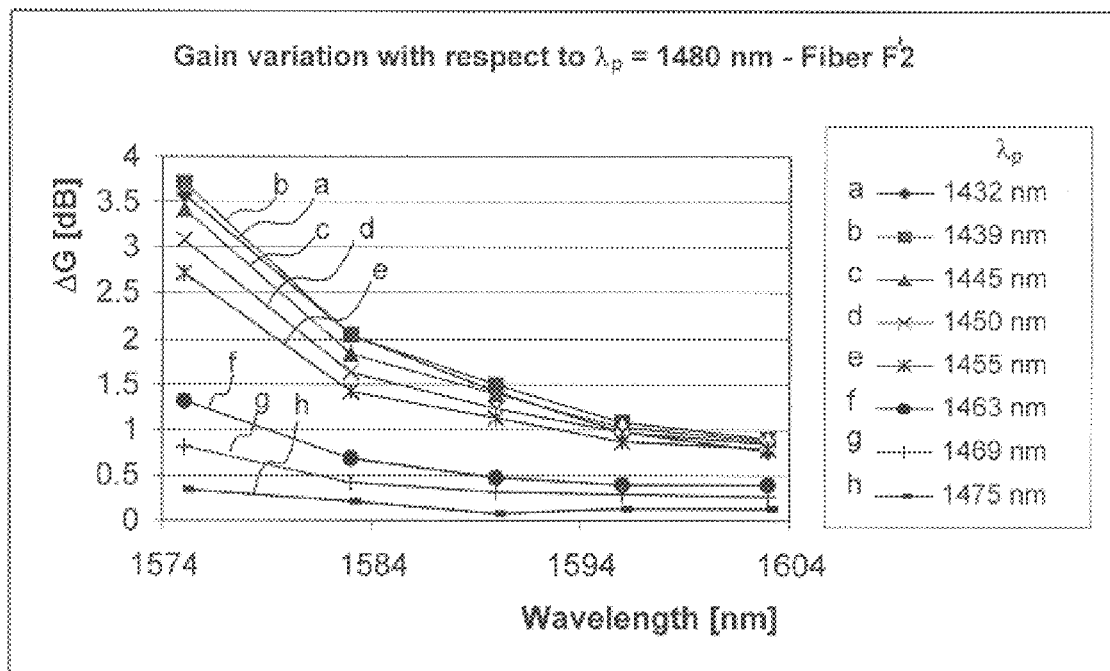

FIGS. 18 and 19 show the difference ΔG between the gain for various pump wavelength $\lambda_p$ and the gain for $\lambda_p$=1480 nm. The results of FIGS. 18 and 19 demonstrate, in particular, that fiber F'2 presents gain variations ΔG slightly lower than fiber F'1. For example, for fiber F'1 the channel at 1575 nm is associated with a gain increase of about 60% when the pump wavelength passes form $\lambda_p$=1480 nm to 1439 nm, while for fiber F'2 the increase is 56%.

Figure 20:
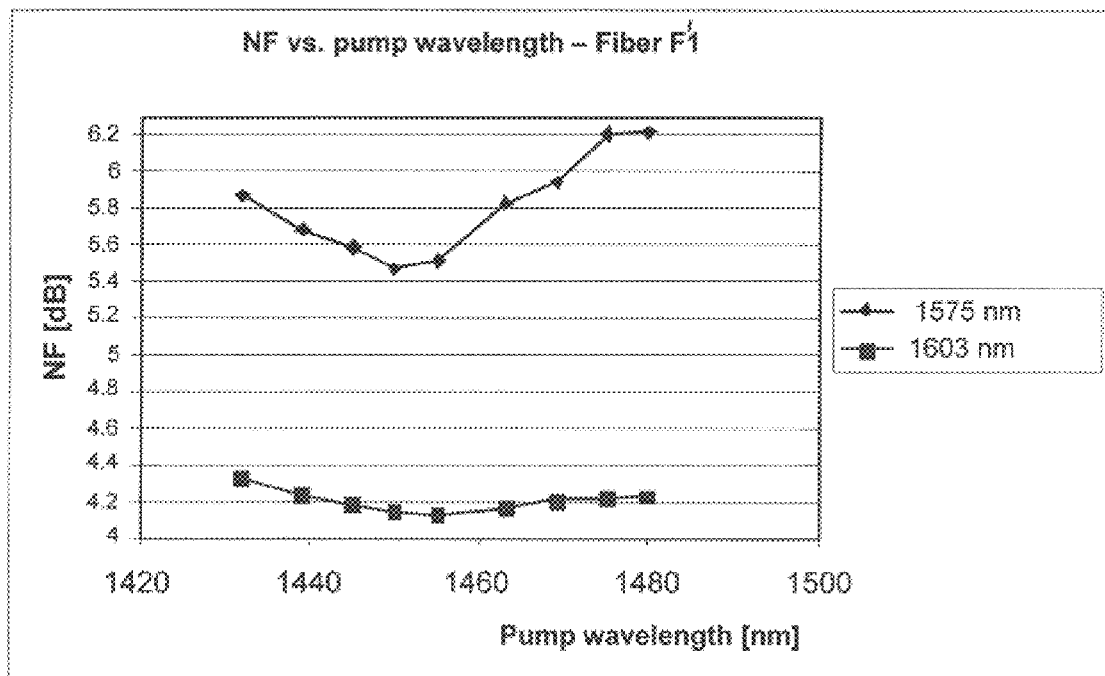
Figure 21:
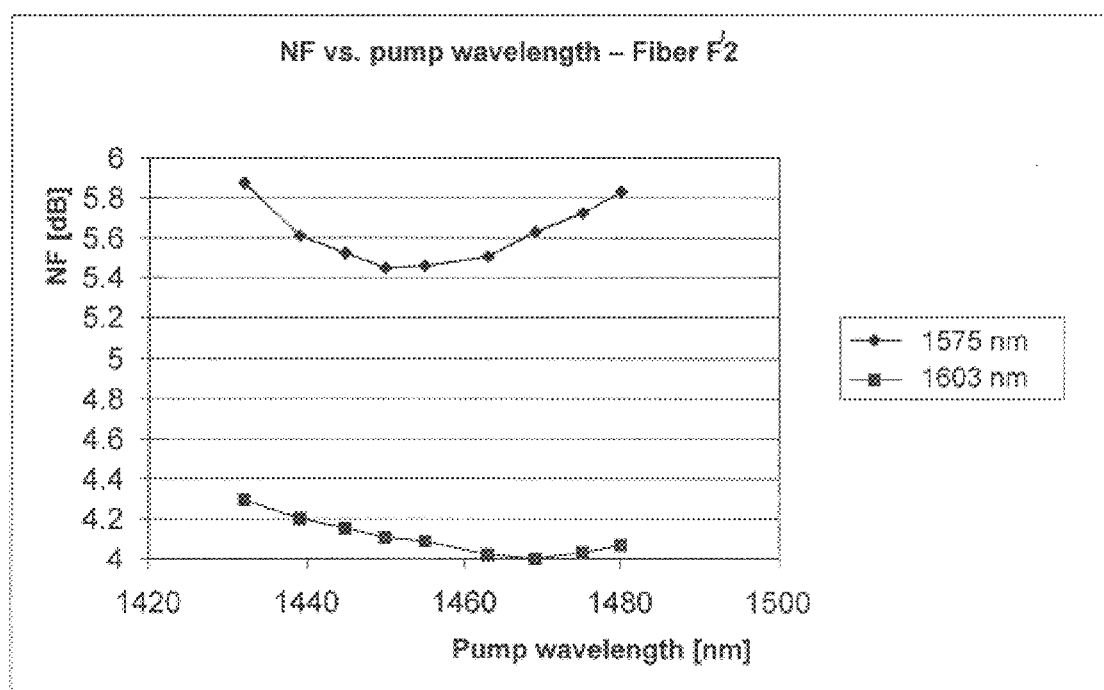

FIGS. 20 and 21 show the noise figure NF, respectively for fibers F'1 and F'2, for the 1575 nm and 1603 nm channels and for different values of the pump wavelength (from 1432 nm to 1480 nm). The comparison between FIGS. 20 and 21 shows that Fiber F'2 has greater performances in terms of noise figure. It is also derivable that, for both types of fiber, channels located at the beginning of the L-band present a noise figure which has a greater sensibility to pump wavelength. It is also observable that for the lower-wavelength channel (1575 nm) the noise figure presents a minimum around 1455 nm and increases from this minimum when the pump wavelength decreases.

Third Experiment (double-stage pre-amplifier—32 channels)

In order to assess the effects of the pump wavelength variations on the gain curve flatness, a new set of measures have been performed with 32 channels spaced by 1 nm in the band 1575–1601 nm. Only fiber F'2 was used for this experiment, due to its better characteristics in terms of output power and amplification gain. The total input power was −8 dBm and the maximum disequalization was 1 dBm. The fiber length was optimized for each pump wavelength in order to have the desired output spectrum flatness, in particular to have a disequalization lower than the said value. In more detail, the optimum length was found by starting with a fiber of excessive length (for example having a total loss of 800 dB) and then repeating the steps of reducing the length of the fiber (by cutting each time a predetermined length) and measuring the output spectrum, until the desired disequalization (<1 dB) was reached.

The setup was the same as in FIG. 14, with thirty-two signal sources 118.

Figure 22:
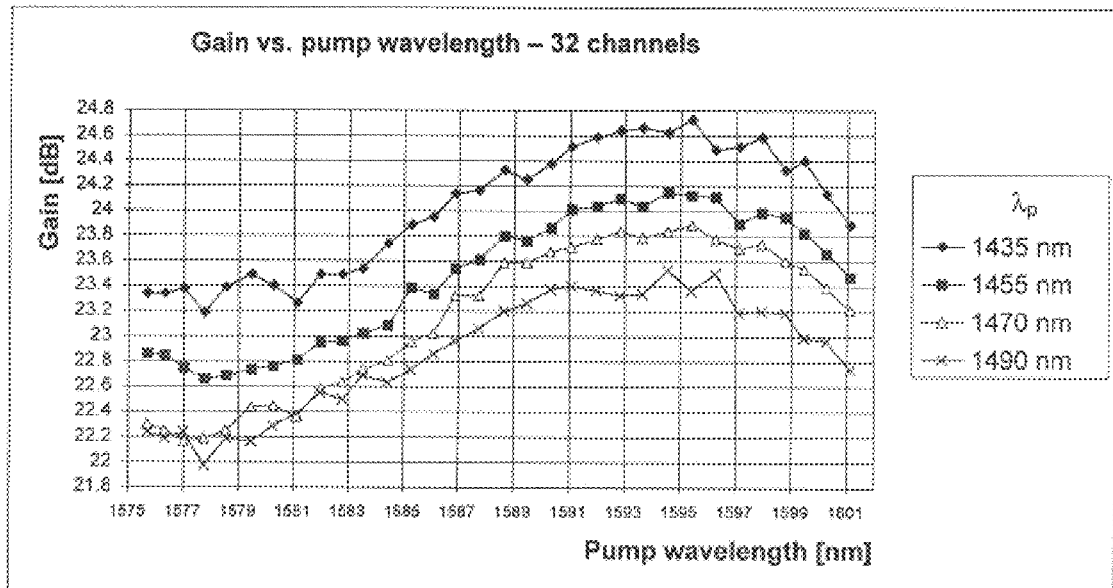
Figure 23:
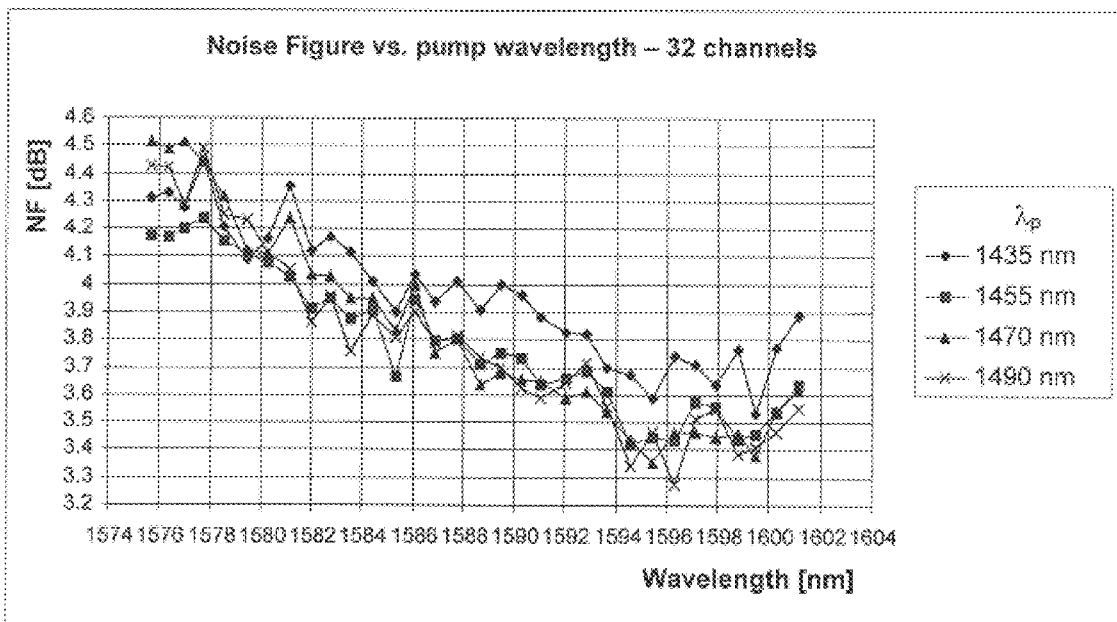

FIGS. 22 and 23 represent the detected gain curves and noise figures for different values of the pump wavelength.

The results of FIG. 22 confirm that a decrease of the pump wavelength causes an increase of the amplification gain and shows that the spectrum flatness does not substantially change.

FIG. 23 demonstrates that the noise figure is greater at the beginning of the considered band and that, in the range below 1479 nm, the noise figure is minimum for $\lambda_p$=1455 nm, confirming that the noise figure (differently from the amplification gain) does not show a continuous improvement with the pump wavelength detuning.

Fourth Experiment (double-stage booster -5 channels)

After studying how the pump wavelength detuning influences the amplifier's performances when operated as a pre-amplifier, the same study has been made by operating the amplifier as a booster amplifier (like amplifier section 53 in FIG. 3). The setup was the same used for the second experiment. The input signal included five channels and had a total power of 0 dBm. The double-stage amplifier was bidirectionally pumped with 53 mW at each end.

Figure 24:
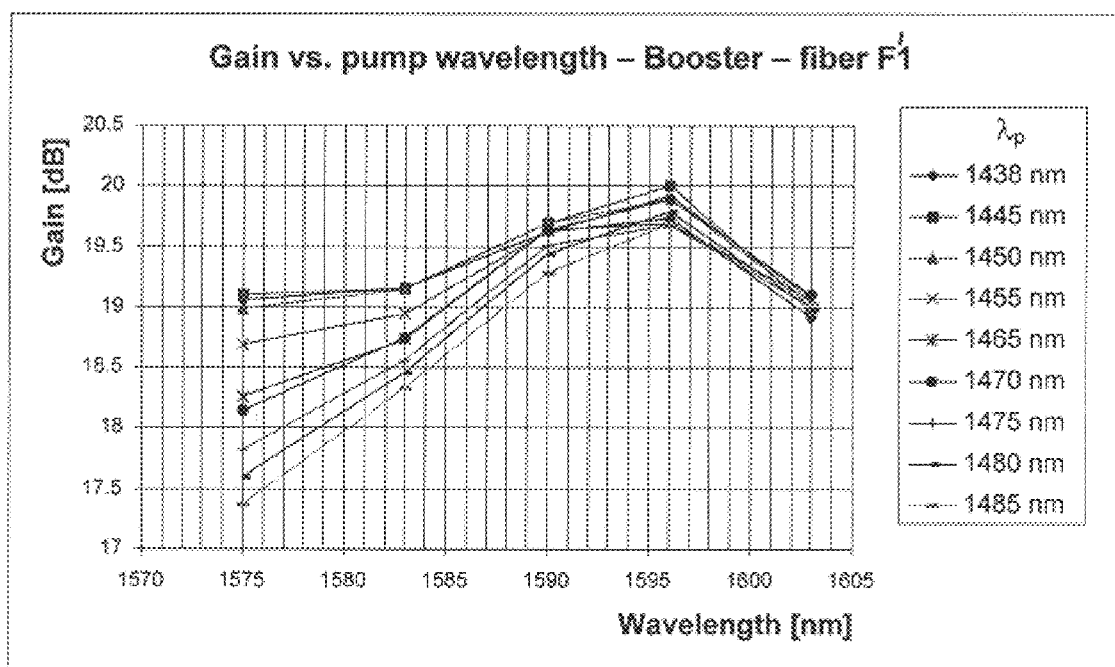
Figure 25:
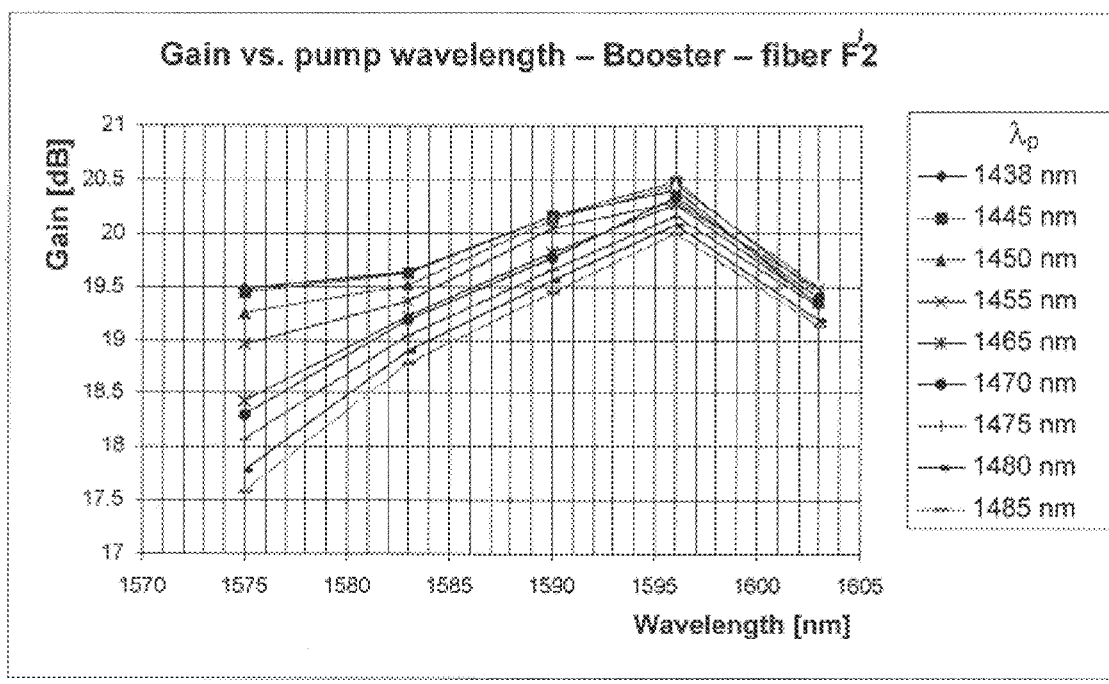

FIGS. 24 and 25 show the gain spectrum of the booster for different pump wavelengths, for fiber F'1 and F'2, respectively. In this case, too, one can observe the 1480 nm pump detuning causes an increase of the amplification gain. Such an increase takes place for both the considered fibers, although the differences between the two fibers are less evident than in the case of the pre-amplifier.

Figure 26:
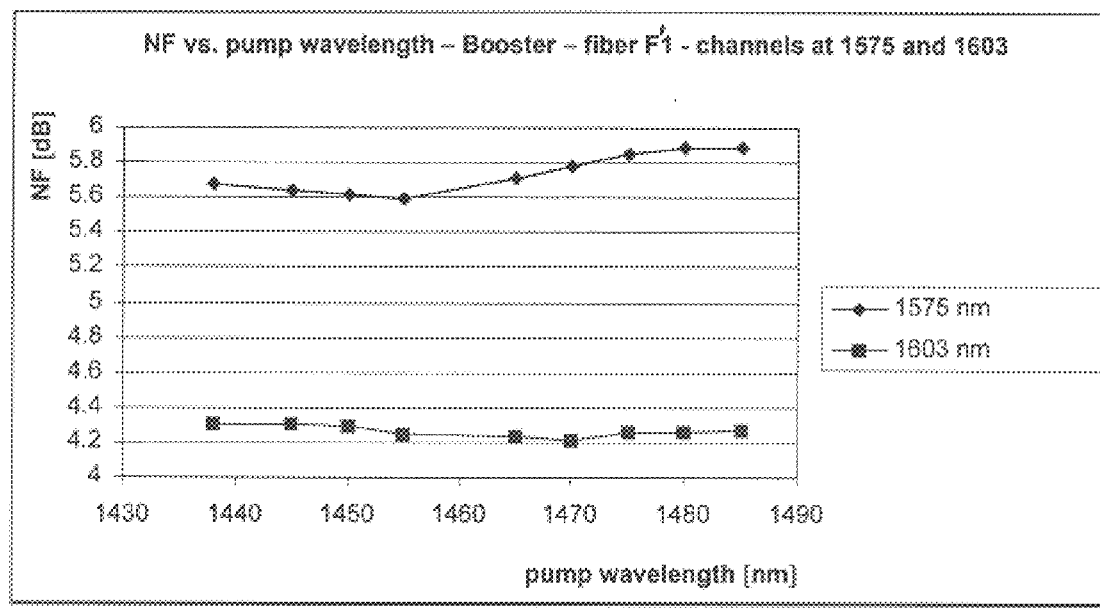
Figure 27:
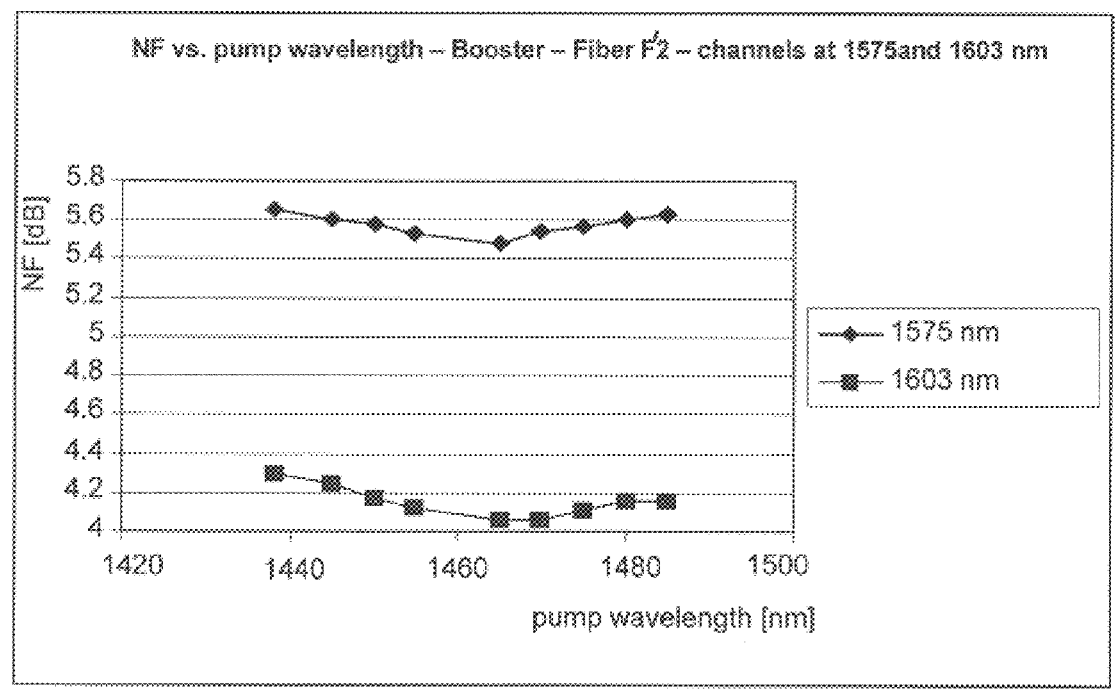

FIGS. 26 and 27 illustrate the noise figure NF, respectively for fibers F'1 and F'2, for the 1575 nm and 1603 nm channels and for different values of the pump wavelength (from 1432 nm to 1480 nm). Both fibers F'1 and F'2 present a minimum of the noise figure for a pump wavelength around 1455–1460 nm, but the sensibility to detuning is lower than in the case of the pre-amplifier.

Fifth Experiment (ASE)

The study the influence of pump detuning on the ASE, a further experiment was conducted by the setup shown in FIG. 28. The experiment consisted in providing to the active fiber (in the present case fiber 103a) a signal at 1558 nm together with a pump radiation at a wavelength variable between 1426 nm and 1493 nm. The setup included a laser source 121 coupled to input 101 and adapted to provide the signal at 1558 nm, a spectrum analyzer 122 coupled to fiber 103a via a 95/5 splitter 123 interposed between coupler 105 and fiber 103. Splitter 123 is adapted to provide to the spectrum analyzer 112 5% of the power of the counter-propagating ASE generated in the fiber. The pump radiation is monitored by means of the pump monitor 111 coupled to the pump source (laser diode) 104 via the 99/1 splitter 112. Fiber 103b, coupler 107, pump source 106 and isolator 109 are absent.

The length of fiber 103a was selected in order to have a total absorption at peak wavelength of 350 dB.

The pump wavelength was varied by controlling the operative temperature of the laser diode 104. The pump power fed to fiber 103a was 40 mW. The input power of the signal at 1558 nm was −8 dBm.

FIGS. 29 and 30 show the spectra of the counter-propagating ASE for different values of the pump radiation, in the absence and in the presence of the signal at 1558 nm, respectively. As can be observed, the counter-propagating ASE emission spectrum vary sensibly when the pump wavelength is varied. In particular, for short wavelengths (1426 nm–1428 nm), the spectrum presents a considerably reduction of the peak at 1534 nm, which is instead relatively high with greater values of the pump wavelength (1470–1490 nm). The results are substantially the same in the two cases in which the 1558 nm signal is respectively present and absent.

A further measure was made to detect the power of the counter-propagating ASE. This power was detected in the same conditions as above, by using a power meter (not shown) in place of the spectrum analyzer 122. The resultant ASE power is illustrated in FIG. 31, as a function of pump wavelength, in both cases of presence and absence of signal at 1558 nm. It can be noticed that the counter-propagating ASE power increases until the pump wavelength is about 1470 nm, then it presents a large maximum, and finally decreases.

Therefore, it is possible to state that for shorter pump wavelength the ASE is lower. This allows having a greater population inversion in the fiber, which is available for signal amplification.

The above described experiments show that, keeping the pump power constant, a reduction of the pump wavelength below 1480 nm produces an increase in the output signal power. The increase is more sensible in the first part of the L-band. It was also observed that the said pump detuning produces an improvement of the noise figure, although a worsening may be observed, in certain circumstances, for relatively low values of the pump wavelength. In the tested amplifier, the noise figure showed a minimum for a pump wavelength of about 1455 nm.

The Applicant has demonstrated that, for amplification in the L-band, the performances (in particular in terms of power conversion efficiency) of an optical amplifier pumped at 1480 nm or below 1480 nm can be improved by opportunely choosing the NA and the Al concentration of the active fiber, keeping constant the other parameters.

The optical amplifier described and illustrated in the present invention has a pumping configuration, which may be varied so as to include further solutions. In particular, each active fiber of the amplifier may be pumped co-propagating, counter-propagating or bidirectionally. Moreover, although the amplifier of the present invention includes at least one pump source operating at a wavelength greater than 1400 nm and lower than 1480 nm, it may include one or more further pump sources operating at a different wavelength, for example 980 nm or below 980 nm. Also, pumping multiplexing is considered, for example among a plurality of pump sources operating at different wavelengths greater than 1400 nm and lower than 1480 nm, coupled to a respective active fiber for co-propagating, counter-propagating or bi-directional pumping.

What is claimed is:

1. Optical transmission system comprising:
   an optical transmitting unit to transmit optical signals in a transmission wavelength band above 1570 nm,
   an optical receiving unit to receive said optical signals,
   an optical fiber link optically coupling said transmitting unit to said receiving unit and adapted to convey said optical signals, and
   at least an topical amplifying unit coupled along said link and adapted to amplify said optical signals; said optical amplifying unit having an amplification wavelength band including said transmission wavelength band and comprising:
      an input for the input of said optical signals,
      an output for the output of said optical signals,
      at least an erbium-doped active fiber having a first end optically coupled to said input and a second end optically coupled to said output, for the amplification of said optical signals,
      a pump source for generating a pump radiation adapted to excite erbium, and
      an optical coupler optically coupling said pump source to said at least an active fibre,
   wherein said pump source has an emission wavelength greater than 1400 nm and lower than 1470 nm, and said active fiber has a numeric aperture NA between 0.25 and 0.32 , and wherein the fiber has a core wherein Al concentration in the core is between 1% and 6% weight molar concentration.

2. Optical transmission system according to claim 1, wherein said pump source has an emission wavelength between 1430 nm and 1460 nm.

3. Optical transmission system according to claim 1, wherein said optical coupler is positioned between said input and the first end of said at least an active fiber to provide said pump radiation to said at least an active fiber in a co-propagating direction.

4. Optical transmission system according to claim 3, wherein said optical amplifying unit includes a further pump source for generating a further pump radiation adapted to excite erbium, and a further optical coupler positioned between the second end of said at least an active fiber and said output to provide said further pump radiation to said at least an active fiber in a counter-propagating direction.

5. Optical transmission system according to claim 1, wherein said at least an active fiber includes a first and a second active fiber arranged in series.

6. Optical transmission system according to claim 1, comprising a WDM system.

7. Method for transmitting optical signals, comprising generating an optical signal having a wavelength greater than 1570 nm, transmitting said optical signal in a long-distance optical fiber link and receiving said optical signal, said step of transmitting including feeding said optical signal to at least an erbium-doped active fiber for amplification, said active fiber having numeric aperature NA between 0.25 and 0.32, and wherein the fiber has a core wherein Al concentration in the core is between 1% and 6% weight molar concentration, and providing to said at least an erbium-doped active fiber a pump radiation having a wavelength greater than 1400 nm and lower than 1470 nm.

8. Method according to claim 7, wherein said pump radiation has a wavelength greater than 1430 nm and lower than 1460 nm.

9. Method according to claim 7, wherein said step of generating at optical signal includes generating a plurality of optical signals at respective wavelengths greater than 1570 nm, and said step of transmitting including wavelength multiplexing said plurality of optical signals.

10. Method according to claim 7, wherein said at least an erbium-doped active fiber includes a first and a second erbium-doped active fiber, and wherein said step of providing to said at least an erbium-doped active fiber a pump radiation includes providing to each of said first and second active fiber respective pump radiations in a co-propagating direction and/or in a counter-propagating direction.

11. Optical amplifying unit having an amplification wavelength band above 1570 nm, comprising:
    an input for the input of optical signals,
    an output for the output of said optical signals,
    at least an erbium-doped active fiber having a first end optically coupled to said input and a second end optically coupled to said output for the amplification of said optical signals, said optical fiber having a numeric aperture NA between 0.25 and 0.32, and wherein the fiber has a core wherein Al concentration in the core is between 1% and 6 % weight molar concentration,
    a pump source for generating a pump radiation adapted to excite erbium, and
    an optical coupler optically coupling said pump source to said at least an active fiber,
    wherein said pump source has an emission wavelength greater than 1400 nm and lower than 1470 nm.

12. Optical amplifying unit according to claim 11, wherein said at least an erbium-doped active fiber includes a first active fiber and a second active fiber arranged in series, said optical coupler feeding said pump radiation to said first active fiber, said optical amplifying unit including a further pump source for generating a further pump radiation adapted to excite erbium and a further optical coupler for feeding said further pump radiation to said second active fiber.

13. Optical amplifying unit according to claim 12, wherein said optical coupler is positioned between said input and said first active fiber for feeding said pump radiation to said first active fiber in a co-propagating direction, and said further optical coupler is positioned between said second active fiber and said output for feeding said further pump radiation to said second active fiber in a counter-propagating direction.

14. Optical amplifying unit according to claim 11, wherein the active fiber has a core including a concentration of Al between 2% and 3% weight molar concentration.

15. Optical amplifying unit according to claim 11, wherein said active fiber has a numeric aperture NA between 0.27 and 0.3.

16. Optical amplifying unit having an amplification wavelength band above 1570 nm, comprising:

an input for the input of optical signals, an output for the output of said optical signals, at least an active fiber having a core doped with erbium and aluminum and having a first end optically coupled to said input and a second end optically coupled to said output for the amplification of said optical signals, a pump source for generating a pump radiation at a wavelength between 1400 nm and 1480 nm for exciting erbium, and an optical coupler optically coupling said pump source to said at least an active fibre, wherein Al concentration in the core of said active fiber is between 1% and 6% weight molar concentration, and the active fiber has a numerical aperture NA of between 0.25 and 0.32 .

17. Optical amplifying unit according to claim 16, wherein the Al concentration in the core of said active fiber is between 2% and 3% weight molar concentration.

18. Optical amplifying unit according to claim 16, wherein said active fiber has a numeric aperture NA between 0.27 and 0.3.

19. Optical amplifying unit having an amplification wavelength band above 1570 nm, comprising:

an input for the input of optical signals, an output for the output of said optical signals, at least an active fiber having a core doped with erbium and aluminum and having a first end optically coupled to said input and a second end optically coupled to said output for the amplification of said optical signals, a pump source for generating a pump radiation at a wavelength between 1400 nm and 1480 nm for exciting erbium, and an optical coupler optically coupling said pump source to said at least an active fiber, wherein said active fiber has a numeric aperture NA between 0.25 and 0.32, and wherein the fiber has a core wherein Al concentration in the core is between 1% and 6% weight molar concentration.

20. Optical amplifying unit according to claim 19, wherein said active fiber has a numeric aperture NA between 0.27 and 0.3.

\* \* \* \* \*